US010815053B2

(12) United States Patent
Starkey et al.

(10) Patent No.: US 10,815,053 B2
(45) Date of Patent: *Oct. 27, 2020

(54) WASTE RECEPTACLE

(71) Applicant: EDISON NATION MEDICAL, LLC, Charlotte, NC (US)

(72) Inventors: Michael Morgan Starkey, Kent, OH (US); Lloyd Stephen Riggs, Auburn, AL (US); Aubrey Nathan Beal, Scottsboro, AL (US)

(73) Assignee: EN MEDICAL, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,025

(22) Filed: Sep. 14, 2018

(65) Prior Publication Data

US 2019/0016530 A1    Jan. 17, 2019

Related U.S. Application Data

(63) Continuation of application No. 15/838,108, filed on Dec. 11, 2017, now Pat. No. 10,077,153, which is a
(Continued)

(51) Int. Cl.
*B65F 1/14*    (2006.01)
*B62B 3/02*    (2006.01)
(Continued)

(52) U.S. Cl.
CPC ............ *B65F 1/1484* (2013.01); *B62B 3/02* (2013.01); *B62B 3/04* (2013.01); *B62B 3/106* (2013.01);
(Continued)

(58) Field of Classification Search
CPC ...... B65F 1/1484; B65F 1/004; B65F 1/1473; B65F 1/06; B65F 1/1415; B62B 3/106; B62B 3/02; B62B 3/04; G08B 21/24
See application file for complete search history.

(56) References Cited

U.S. PATENT DOCUMENTS 9,840,369 B2 * 12/2017 Starkey ................. B65F 1/1473
9,842,484 B2 * 12/2017 Starkey ..................... B62B 3/02
(Continued)

*Primary Examiner* — Leon Flores
(74) *Attorney, Agent, or Firm* — Chad D. Tillman; Tillman Wright, PLLC

(57) ABSTRACT

A waste cart includes a base housing; a center upright having a proximal end and a distal end, wherein the proximal end is secured to the base housing; a top housing secured to the distal end of the center upright, wherein the top housing has two or more disposal openings for two or more separate disposal portions including, a first waste portion which has a first metal detector and an indicator for providing a notification when a metal item passes through the opening; and a second waste portion which includes a second metal detector and an indicator for providing a notification when a metal item passes through the opening; an electronics module which operates each metal detector independently; and an alarm indicator operationally associated with the electronics module which is activated when the electronics module detects the passage of a metal item through an opening into a waste portion.

20 Claims, 21 Drawing Sheets

Related U.S. Application Data continuation of application No. 15/421,329, filed on Jan. 31, 2017, now Pat. No. 9,840,369, which is a continuation of application No. 14/815,605, filed on Jul. 31, 2015, now Pat. No. 9,637,309.

(60) Provisional application No. 62/730,942, filed on Sep. 13, 2018.

(51) Int. Cl.
*B62B 3/04* (2006.01)
*B62B 3/10* (2006.01)
*B65F 1/06* (2006.01)
*G08B 21/24* (2006.01)
*B65F 1/00* (2006.01)

(52) U.S. Cl.
CPC ............... *B65F 1/004* (2013.01); *B65F 1/06* (2013.01); *B65F 1/1415* (2013.01); *B65F 1/1473* (2013.01); *G08B 21/24* (2013.01); *B62B 2202/20* (2013.01); *B62B 2202/22* (2013.01); *B65F 2210/128* (2013.01); *B65F 2210/1525* (2013.01); *B65F 2240/145* (2013.01)

(56) References Cited

U.S. PATENT DOCUMENTS

| | | | |
|---|---|---|---|
| 10,077,153 B2 * | 9/2018 | Starkey | B65F 1/004 |
| 2017/0144836 A1 * | 5/2017 | Starkey | B65F 1/1473 |
| 2017/0144837 A1 * | 5/2017 | Starkey | B65F 1/1473 |

* cited by examiner

WASTE RECEPTACLE

CROSS-REFERENCE TO RELATED APPLICATION

The present application is a continuation of, and claims the benefit under 35 U.S.C. § 120 to, U.S. patent application Ser. No. 15/838,108, filed Dec. 11, 2017, now U.S. Pat. No. 10,077,153, which '153 application is a continuation of, and claims the benefit under § 120 to, U.S. patent application Ser. No. 15/421,329, filed Jan. 31, 2017, now U.S. Pat. No. 9,840,369, which '329 application is a continuation of, and claims the benefit under § 120 to, U.S. patent application Ser. No. 14/815,605, filed Jul. 31, 2015, now U.S. Pat. No. 9,637,309. The disclosure of the '605 application is incorporated herein by reference.

BACKGROUND OF THE INVENTION

The present invention relates to a waste cart capable of detecting metallic objects as they pass through the cart's openings as disclosed herein below. The medical environment tends to generate three main forms of trash: sharps, biohazard materials, and ordinary trash. Hospital staff tends to waste money by negligently discarding equipment after surgery, typically by unintentionally depositing metal items (e.g., surgical tools) into the trash along with disposable garments (surgical "scrubs") and other potentially hazardous biological waste. The incorporation of a metal detector with a trash can helps to alleviate this problem.

Medical environments outside the hospital (e.g., doctors' offices, hospital rooms, and surgical suites) must also put proper protocols into place for the safe disposal of "sharps". Federal regulations (e.g., 49 CFR 173.134) define a "sharp" as any object that may be contaminated with a pathogen and that is capable of cutting or penetrating skin or a packaging material (and thus leading to injury or disease transmission or both). Sharps include items such as needles, scalpels, broken glass, culture dishes, etc. Federal regulations (e.g., 49 CFR 173.197) require that sharps be placed in containers that are rigid, leak resistant, impervious to moisture, strong enough to prevent tearing or bursting during normal conditions of transport, and puncture resistant.

U.S. hospitals produce an estimated 6,600 tons of waste daily and 4,000,000,000 pounds annually within the hospital, operating rooms tend to generate two main forms of trash: single use sterilized equipment and regular garbage which is sometimes needlessly bagged as hazardous waste. The well-recognized red bags are intended to be used for medical waste that requires more cautious—and thus more expensive—disposal procedures. Some research indicates, however, that up to 90% of items disposed in special red bags are simply regular trash that could be stored in a clear bag and disposed of more conveniently. Thus, a more efficient segregation and disposal of trash could provide significant cost savings in the healthcare industry.

Medical disposal and detector systems currently available have a number of shortcomings. In some, the openings are unfinished and expose the contents of a biohazard bag. The structural materials wear and lack the rigidity of conventional industrial disposals. Because a sterile environment is a fundamental hospital goal, certain types of plastics—especially inexpensive ones—do not necessarily reassure the user as to their cleanliness. Some plastics interact slightly with hospital cleaning materials and develop an undesired sticky texture. In some cases the structures are angular with protruding surfaces and corners, which in turn can catch on medical clothing and draping.

Many structures are singular in their function, so that separate items are needed for the several types of expected waste, which in turn tends to crowd the medical space in an undesired, or in some cases an unsafe or unsanitary, manner.

Appropriate devices must also meet medical regulations for safely storing biohazard materials. The Bloodborne Pathogens Standard of the U.S. Occupational Safety and Health Administration (OSHA) uses the term "regulated waste" to refer to waste items such as:

- liquid or semi-liquid blood or other potentially infectious materials (OPIM);
- items contaminated with blood or OPIM and which would release these substances in a liquid or semi-liquid state if compressed;
- items that are caked with dried blood or OPIM and are capable of releasing these materials during handling;
- contaminated sharps; and
- pathological and microbiological wastes containing blood or OPIM.

With these standards in place, disposal devices generally accept the standard "red bag" used in the hospital environment. The device must be waterproof so that it can be cleaned easily and completely and those portions of devices that are in contact with hazardous materials must be formed of a material that is impermeable rather than porous.

Changing a bag in conventional devices can be both time consuming and inefficient due to their structure and configuration. Systems that require significant user strength are unacceptable in the hospital environment because much work is done by smaller persons. For example, on a percentile basis, in order to capture 99% of potential users, the device should be easily handled by a middle-age female. Additionally, existing devices may preclude access to the full bag or to new bags, are sometimes improperly balanced, may not withstand the weight strain of an overly full or leaning load, and do not offer any method of separating large and small biohazard materials, or provide a separate area for disposing of non-biohazard materials.

Additionally, loss of expensive metallic items such as tools, templates, and other devices plague industries which are unrelated to medicine such as machine shops, automobile garages, assembly plants, laboratories, manufacturing plants, and similar facilities. These industries will benefit equally from a newly improved waste cart.

Hence, a need exists for a waste cart capable of detecting metallic objects as they pass through the cart's openings.

SUMMARY OF THE INVENTION

A waste cart comprises: a base housing; a center upright having a proximal end and a distal end wherein the proximal end is secured to the base housing; a top housing secured to the distal end of the center upright, the top housing having two or more disposal openings for two or more separate disposal portions; a first waste portion which has a first metal detector and an indicator system for providing a notification when a metal item passes through the opening; a second waste portion which includes a second metal detector and an indicator system for providing a notification when a metal item passes through the opening; an electronics module which operates each metal detector independently or in conjunction with each other; and an alarm indicator operationally associated with the electronics module which is activated whenever the electronics module detects the passage of a piece of metal into a waste portion.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
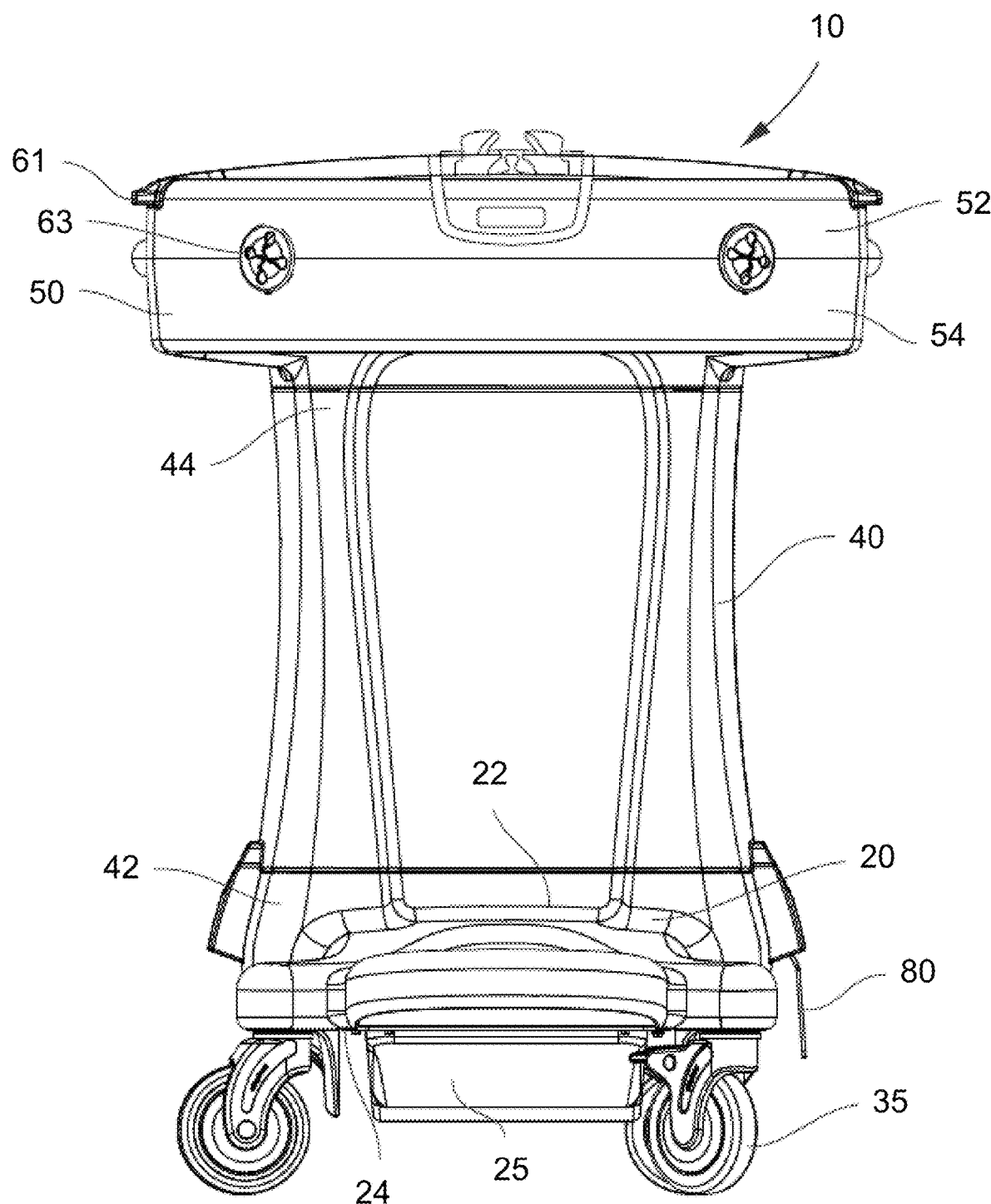
FIG. 1 is a front view of one embodiment of the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Looking at FIGS. 1 through 10 and 20-22, there is illustrated one embodiment of a movable waste cart 10 which is capable of detecting metallic objects as they pass through the cart's openings 56. The waste cart 10 is comprised of a mostly non-metallic composition. The waste cart 10 is comprised of three primary sections which include:
(1) a base housing 20 which is proximally closer to the ground,
(2) a center upright body 40 which is the region disposed between the top housing 50 and base housing 20, and
(3) a top housing 50 which is the region furthest vertically from the base housing 20.

The base housing 20 includes an upper surface 22 and a lower surface 24. The center upright body 40 is secured to and emanates upward from the upper surface of the base housing 20. A battery cover 25 is located on the lower surface of the base housing. In one embodiment of the present invention, the base housing 20 is essentially hollow and includes an inner cavity 30 which houses some or all of the electronic components utilized by the waste cart 10. In another embodiment, the inner cavity 30 houses the electronics module 90, battery 89 (FIG. 25), and other electrical components.

The center upright body 40 has a proximal end 42 and a distal end 44 where the proximal end is secured to the base housing 20 and the distal end is secured to the top housing 50.

Figure 2:
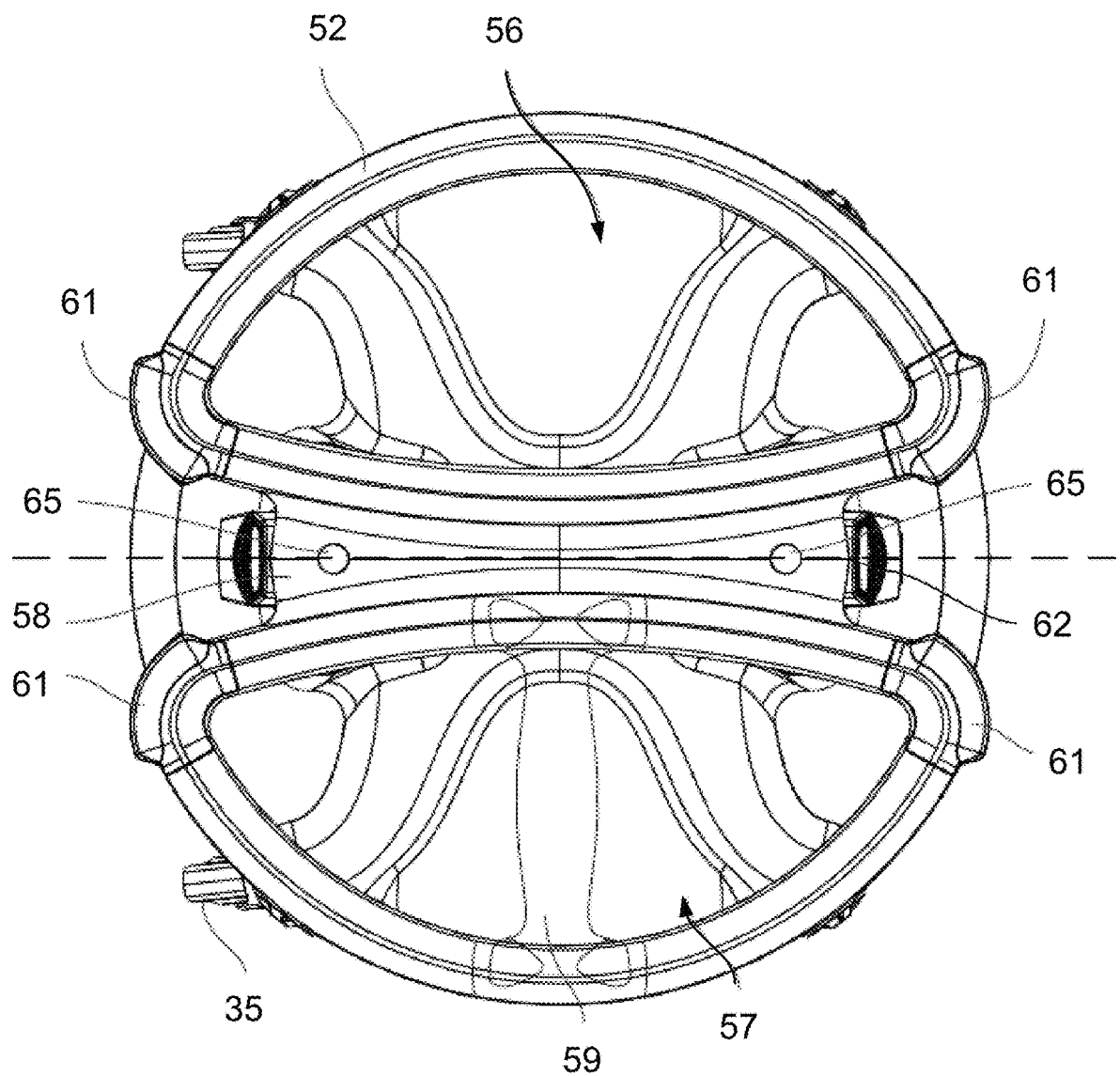
FIG. 2 is a top-down view of one embodiment of the present invention.
Figure 3:
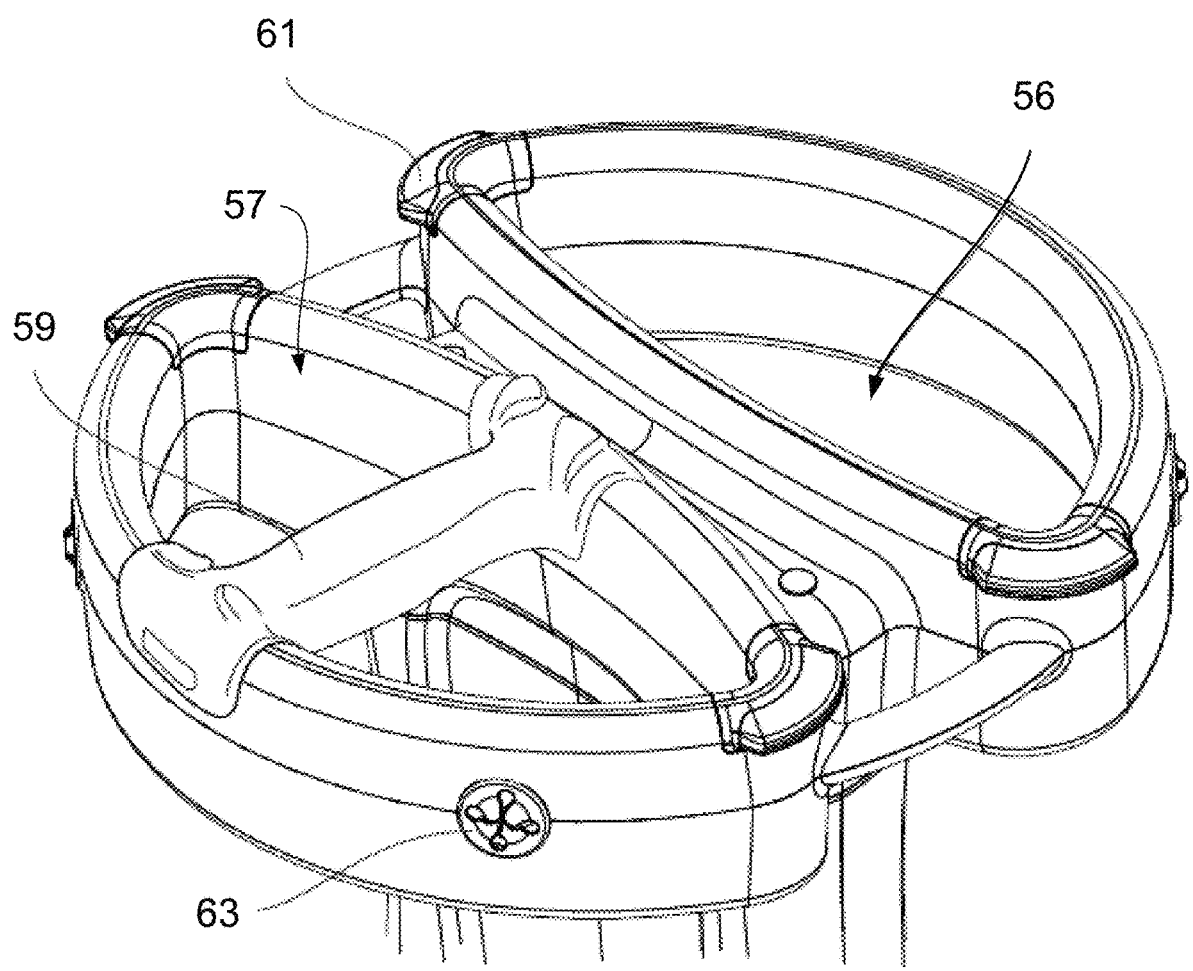
FIG. 3 is a perspective view of one embodiment of the present invention.

The top housing 50 is mainly circular in nature and is bisected, with two or more cart openings for two or more separate disposal portions. The openings may be symmetrical. In a variation of the cart 10 as shown in FIGS. 2 and 3, a divider 59 extends within and bisects opening 57. A first waste portion 70 has a first metal detector 71 and an indicator system with a visual alarm indicator 65 for providing a notification when a metal item passes through the first opening 56. A second waste portion 75 includes a second metal detector 76 and an indicator system with another visual alarm indicator 65 for providing a notification when a metal item passes through a second waste opening 57. An electronics module 90 operates metal detector 71 and metal detector 76 independently, and an audio alarm indicator operationally associated with the electronics module is activated whenever the electronics module detects the passage of a piece of metal into a waste portion. In the one embodiment of the present invention in FIGS. 1-10 and 20-22, the two visual alarm indicators 65 are situated along the bisection line for visual indication. The top housing 50 is made up of a top coil housing 52 secured to a bottom coil housing 54 leaving a hollow cavity 55 within to house the transmitter coil(s) and receiver coil(s). The bottom housing 54 is secured to the distal end 44 of the center upright body 40.

Figure 4:
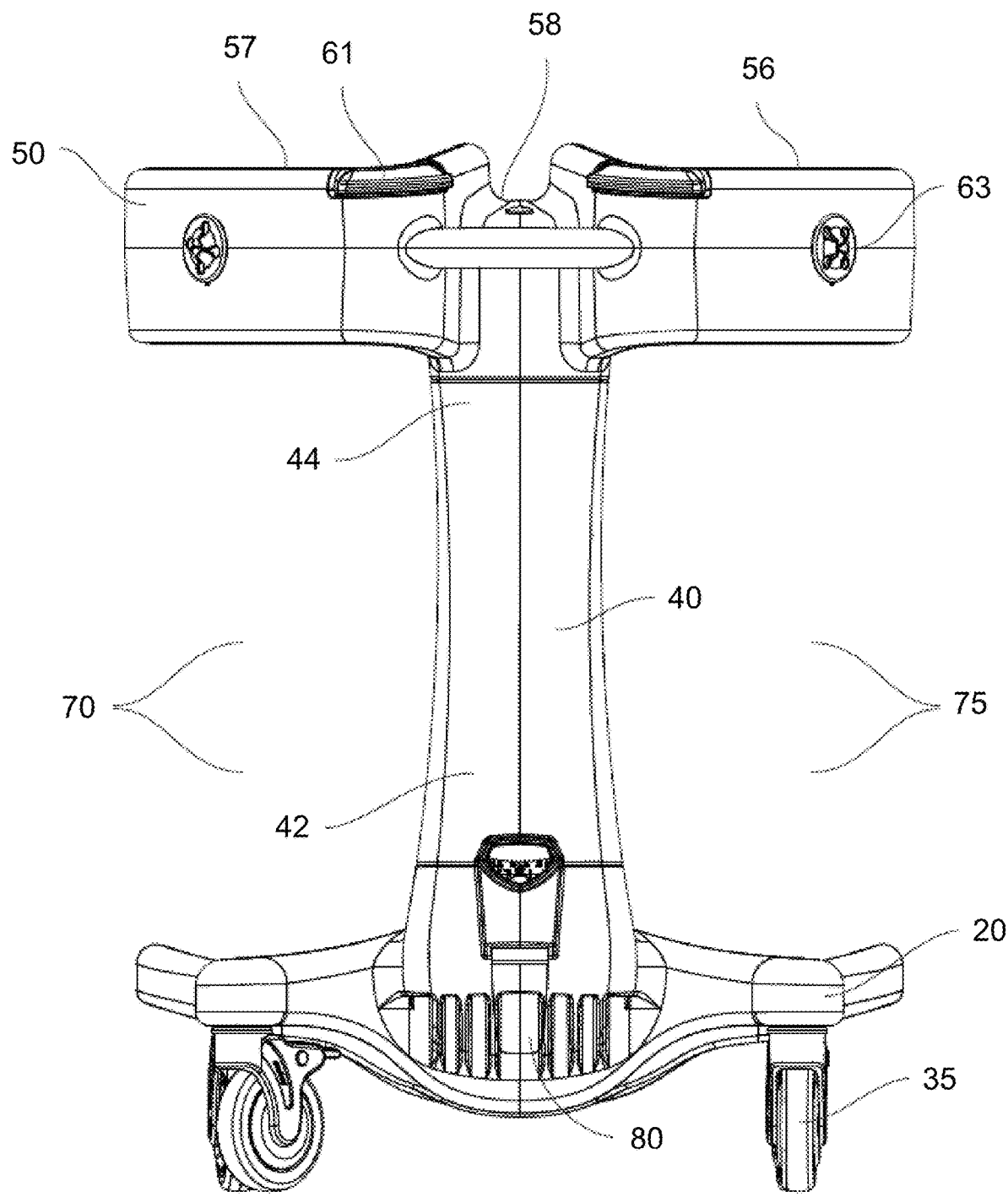
FIG. 4 is a side view of one embodiment of the present invention.
Figure 5:
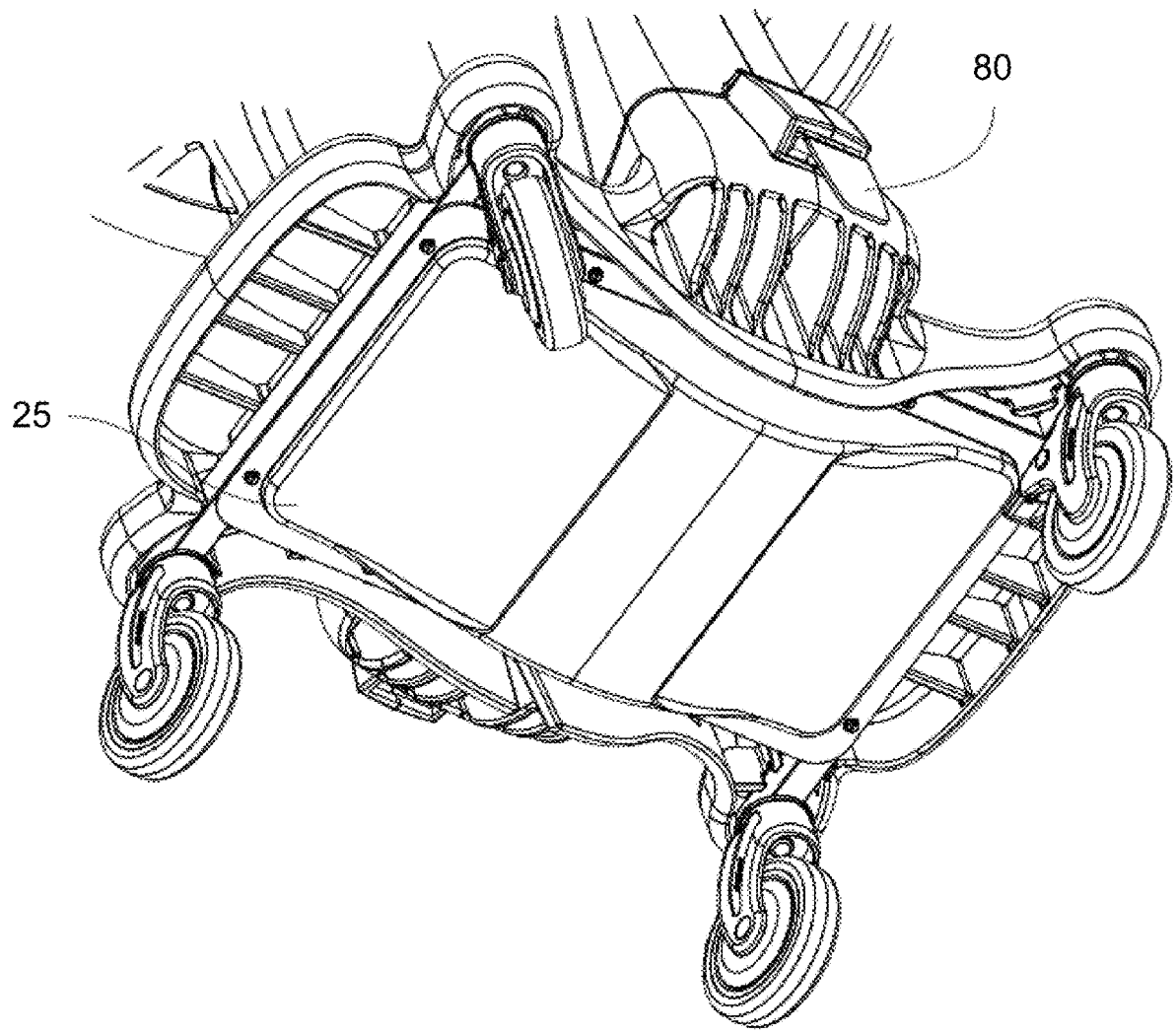
FIG. 5 is a bottom-up perspective view of one embodiment of the present invention.
Figure 6:
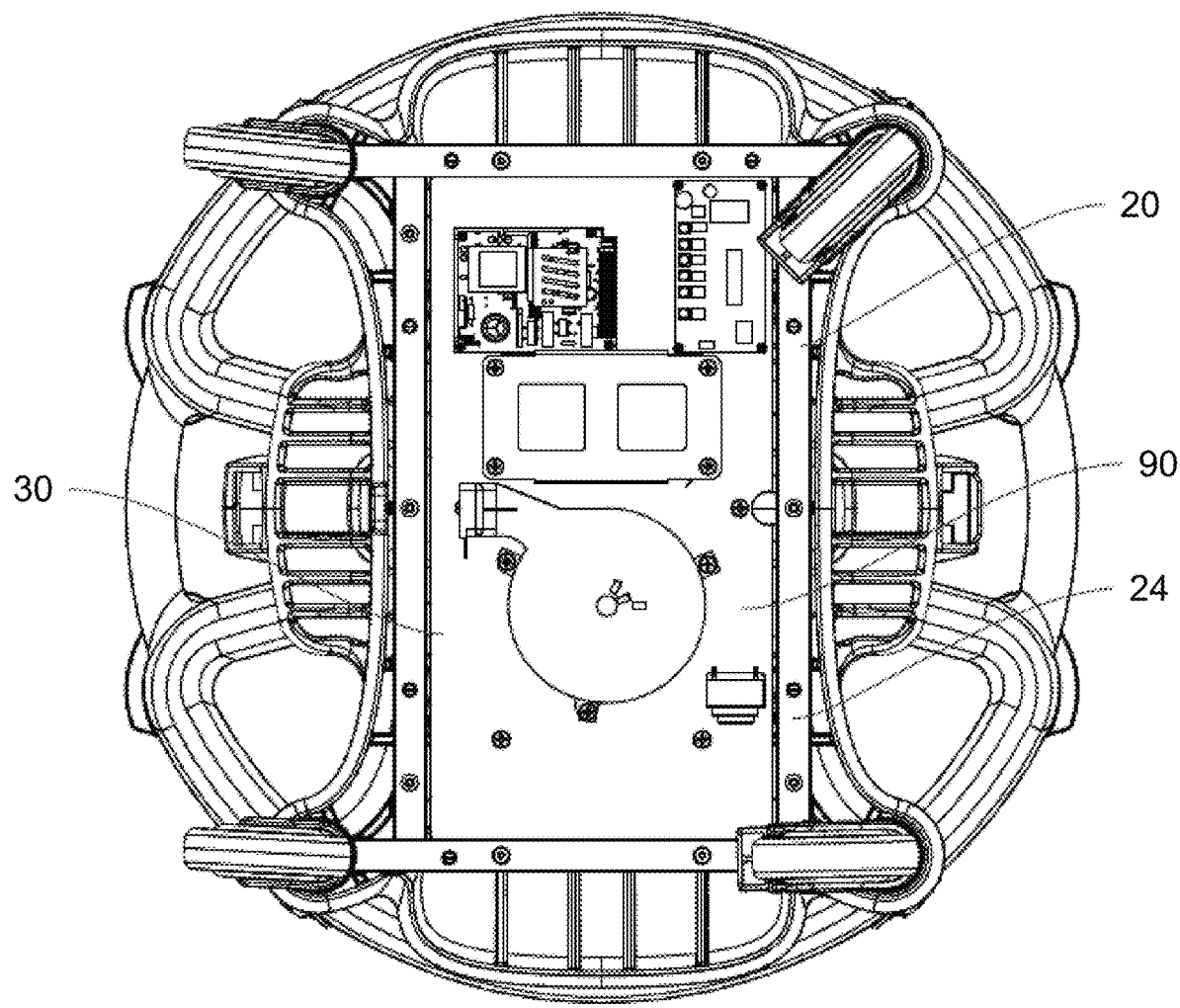
FIG. 6 is a bottom-up view of one embodiment of the present invention.
Figure 7:
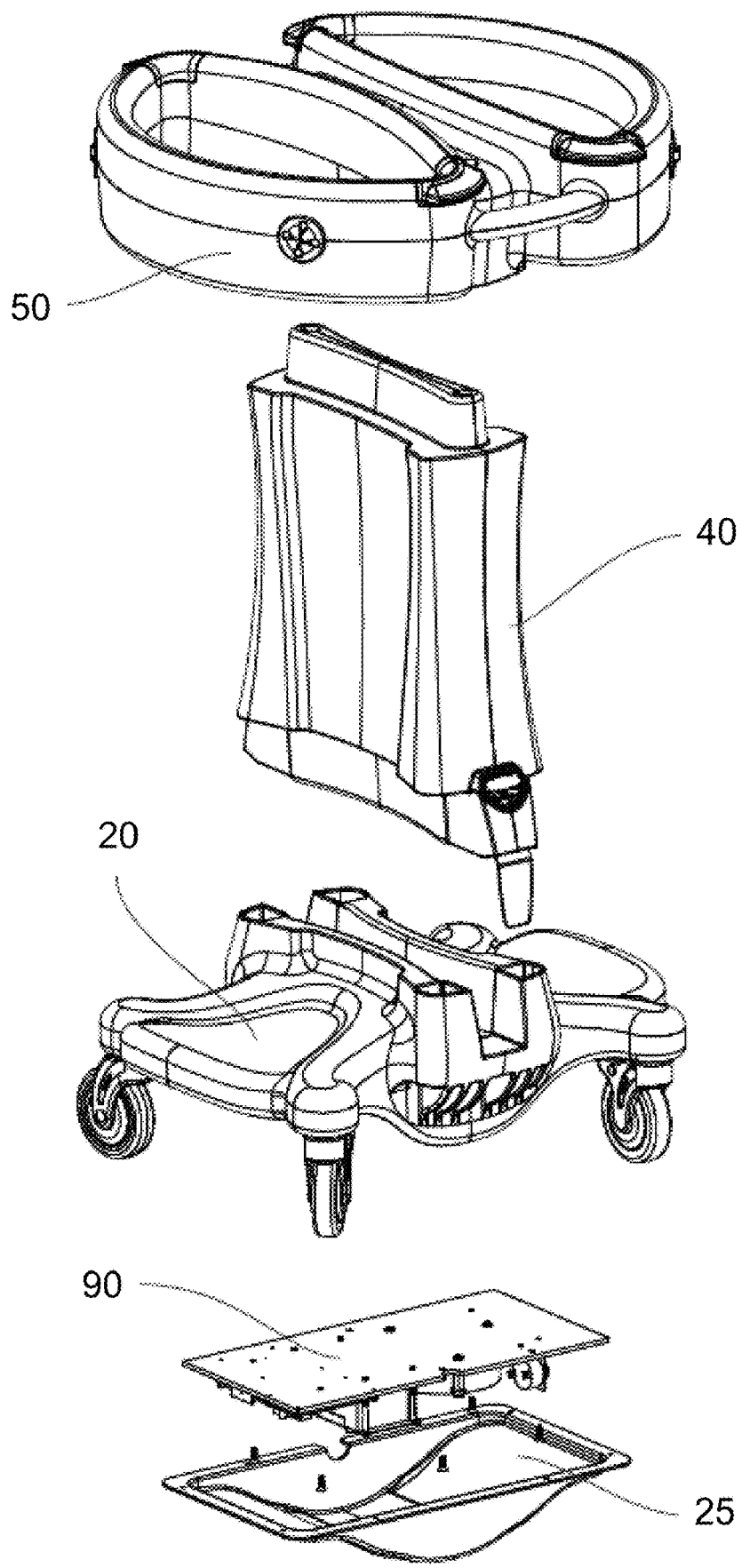
FIG. 7 is an exploded side view of one embodiment of the present invention.
Figure 8:
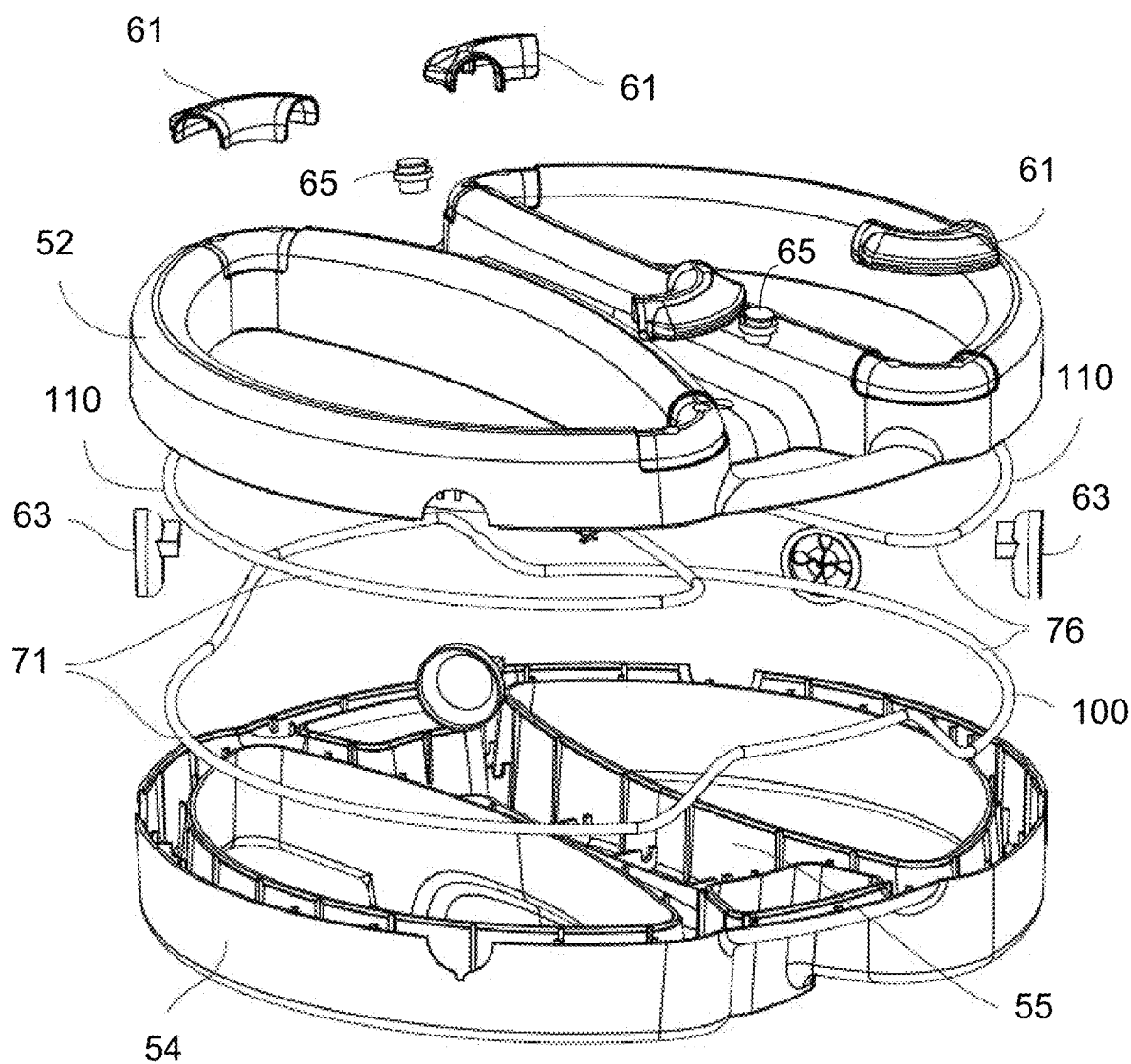
FIG. 8 is an exploded view of the top components of one embodiment of the present invention.
Figure 9:
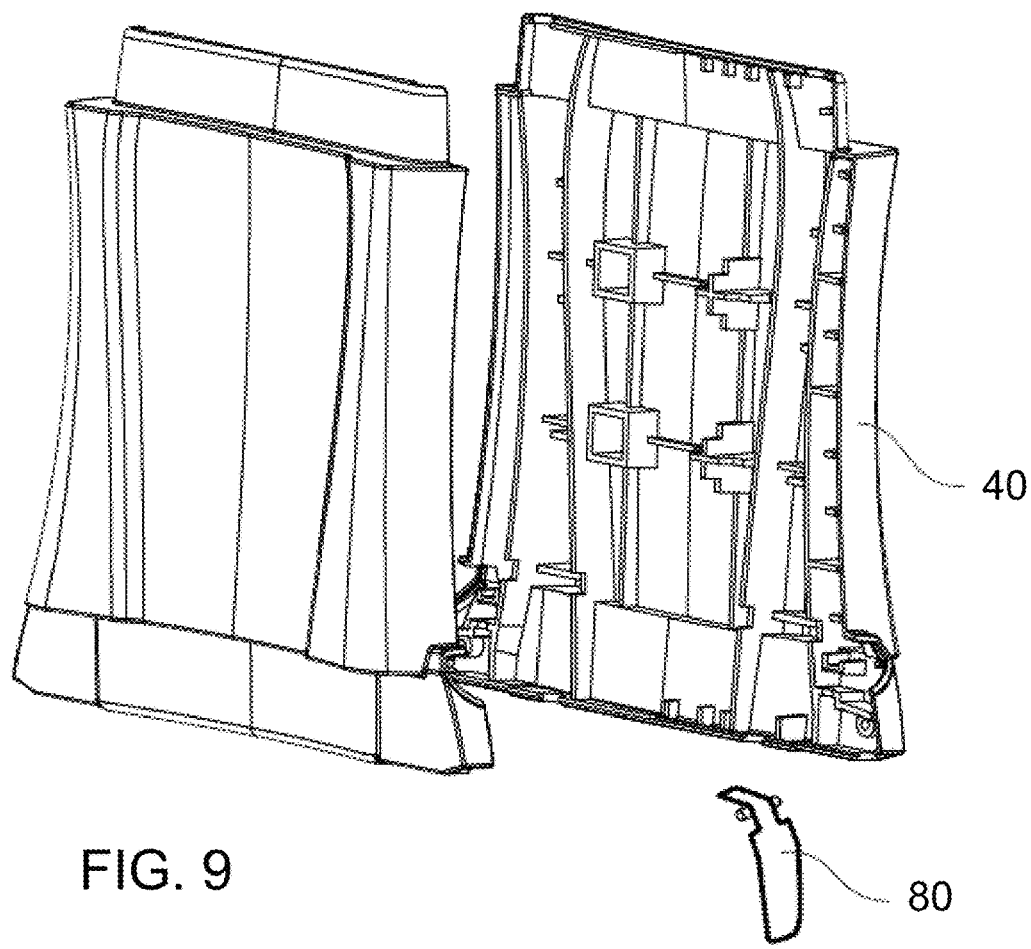
FIG. 9 is an exploded view of the tower components of one embodiment of the present invention.
Figure 10:
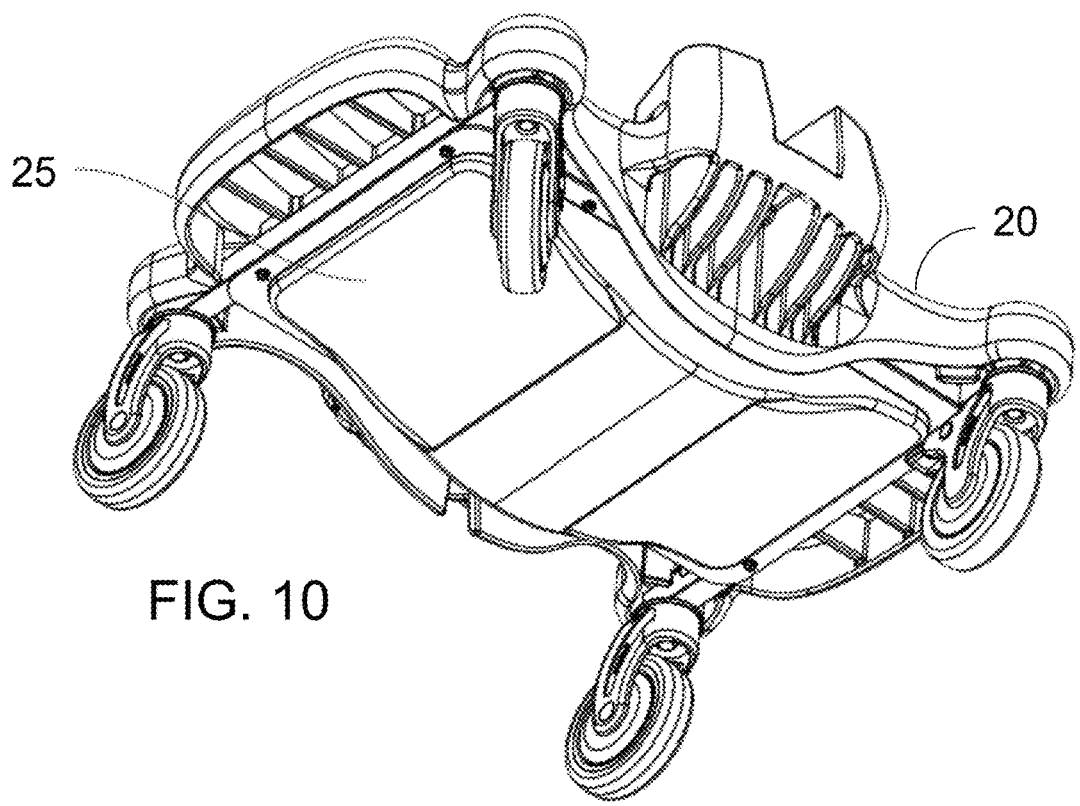
FIG. 10 is a bottom-up perspective view of the base of one embodiment of the present invention.

Bag supports 61 are situated at the two furthest points along the bisection line 62 of each of the openings 56,57 of the top coil housing 52 to aide in holding of inserted waste bag 64. The bag supports 61 make use of friction to help maintain a bag 64 in position after it has been secured within an opening 56,57 of the waste cart 10. One embodiment includes a plurality of bag supports 61 located along the upper surface of the top coil housing 52. The top housing 50 may also include a plurality of bag retainers 63 (FIGS. 3 and 4). The bag retainers 63 function by a person pushing part of the bag 64 within the bag retainer 63 and a spring action of the bag retainer helps to maintain the bag in position. Ensconced within the top housing 50 is a set of three coiled lengths of electrical wire. One of the coils, the transmitter 100, encircles the full perimeter of the top housing 50. Each of the remaining two coils, i.e., the receivers 110, are disposed singularly around the perimeter of each of a respective one of the openings 56,57. The center upright body 40 provides structural support for the top housing 50 and provides a means for containing the electrical connections extending between the top housing 50 and the base housing 20.

As stated previously, the electronics module 90 is contained within the base housing 20. The electronics module 90 is connected (operationally associated) with the coils 100,110 and is connected to a plurality of visual alarm indicators 65 located on the top housing 50 and to an audio alarm indicator 67 (i.e. a speaker), which provides auditory indication when a metallic object passes through an opening 56,57. In one embodiment of the present invention, logic is provided to automatically power down the waste cart 10 after a defined period of time in order to conserve battery power. A means for powering the waste cart 10, while connected to structural power (i.e., a wall outlet) or while mobile, are provided within the base housing 20. The waste cart 10 can be powered either by being plugged into structural wiring or via an internal battery when not plugged in. The switch over from one power source to another occurs without the intervention of the user and does not affect the operation of the system. A plurality of caster wheels 35 are attached to the lower surface 24 of the base housing 20 to allow the waste cart 10 to be easily moved. In one embodiment of the present invention, the cart is intended to be used as the primary location for disposal of all objects not considered to be defined as sharps. In another embodiment, the cart is intended to be used as the primary location for disposal of all objects, including those defined as sharps.

The motion of a conductor (i.e., a metallic object or any materials that will conduct electricity) through a magnetic field results in minute currents being generated within the conductor. As the object passes through the electric field, there is an electrical current induced in the object which can then be detected by the cart 10. The magnetic field can be generated by a permanent magnet or by the application of the flow of electricity to a coil of conductors. As a conductor enters into the magnetic field, the field will induce currents of electrons that will swirl within the conductor much like the small swirling currents in a flowing body of water. These currents remain as the external field exists. If the field is removed, the currents within the conductor will remain temporarily. As there is no input of energy to support the currents, the currents will decay over a period of time. With conductors possessing high conductivity, these currents will decay slower than those in a lower conductivity conductor. With the external field removed, and before the currents have disappeared, the eddy currents will themselves develop a magnetic field. In the opposite manner of energizing a coil to produce a magnetic field, if a coil of conductors is placed within a magnetic field, a voltage will be generated along the length of the coil. This theory is used to detect the presence of metal near a conductor coil.

There are two primary methods for utilizing these components to detect metal: continuous wave (CW) or pulse induction (PI). In a CW system, a continuous signal is generated by a coil transmitter which develops a magnetic field around the coil. A receiver coil 110 is able to pick up the signal from the coil transmitter and the two signals are compared. If an object that can carry a magnetic field enters into proximity to the coil transmitter 100, the signal between the coil transmitter 100 and the receiver coil 110 is disrupted. This disruption is the basis for CW detection systems.

Figure 23:
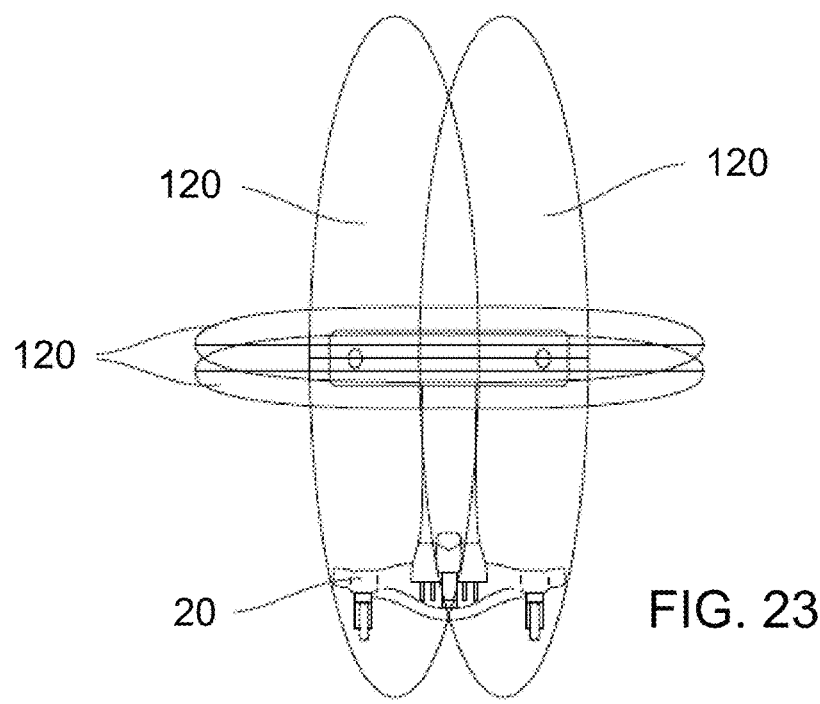
FIG. 23 is an illustration of a perpendicular coil arrangement and the associated detection fields of one embodiment of the present invention.
Figure 24:
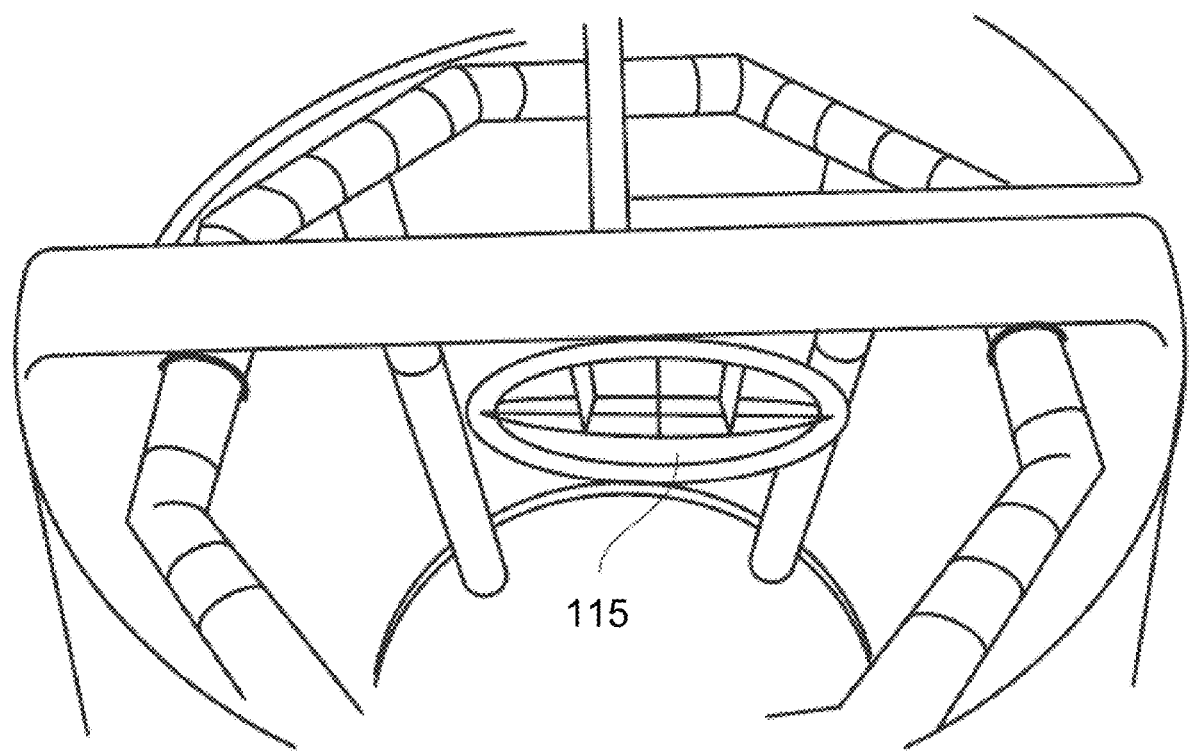
FIG. 24 is a perspective view of a perpendicular coil arrangement of one embodiment of the present invention.

A system operating on a PI will pulse an environment generating a cyclic magnetic field (FIG. 23). When the transmitter coil 100 is turned off, any conductor that was within the transmitter coil's magnetic field will generate a magnetic field as it decays. A receiver coil 110 is able to then detect the decaying magnetic field from the object and in the control system is able to distinguish that an object was present. FIG. 23 illustrates the pairs of magnetic fields 120. Looking now to FIG. 24, there is illustrated an embodiment of the perpendicular coil arrangement 115.

Figure 25:
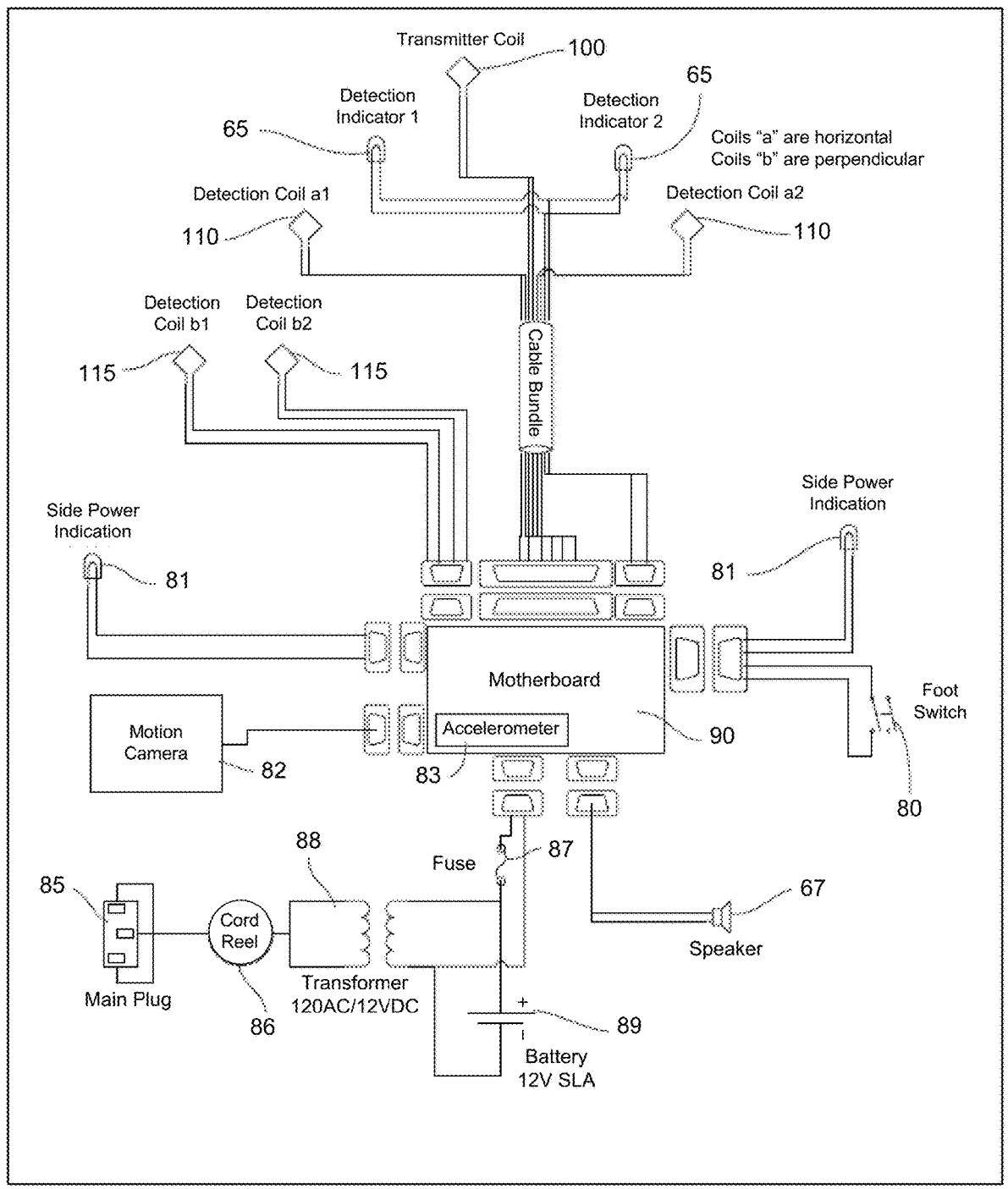
FIG. 25 is a mid-level diagram of one embodiment of the present invention.

Looking now to FIG. 25, there is illustrated a mid-level diagram of one embodiment of the present invention. FIG. 25 includes an illustration of the electronics module 90 which is operationally associated with an acceleration motion detection module or accelerometer 83. The electronics module 90 is operationally associated with switch 80 and one or more visual power indicators 81. The electronics module is also operationally associated with a visual motion detection camera 82 which aids in deactivating the detection process while the cart 10 is in motion. FIG. 25 also details an arrangement of the transmitter coil 100, a pair of detection coils 110, a pair of detection indicators 65, a pair of perpendicular coils 115, and an audio alarm indicator 67, all of which are operationally associated with the electronics module 90. Also included in FIG. 25 are a main plug 85, a cord reel 86, a fuse 87, a power supply 88, and a battery 89.

The current waste cart 10 is an improvement on a previous version of a metal detecting waste bin. The previous version of the device consisted of a single opening with all circuitry and components contained within the top cap of the cart. The device operated on the CW system of metal detection and could only reliably detect ferrous objects. The cart contained a counter, an on/off switch, and a variety of other controls. The cart required a calibration period that was approximately 30 seconds.

The waste cart 10 of the present invention demonstrates the following improvements over the existing art:

The waste cart 10 now has the ability to detect both ferrous and non-ferrous objects which include but are not limited to: iron, steel, stainless steel, titanium, copper, aluminum, silver, and gold.

The waste cart 10 is able to discern between high conductivity objects such as aluminum and lower conductivity objects such as steel.

The waste cart 10 has the ability to retain a significant ability to detect objects while in close proximity to environmental interferers. This is achieved by measuring the response from the receiver coils and adjusting the threshold gain accordingly, essentially increasing the ADC range in FIG. 19.

The waste cart 10 needs only a very short period of time from completely off to be ready to detect (in the range of 0.1 to 10 seconds, 0.1 to 6 seconds, 0.1 to 4 seconds, 0.1 to 2 seconds, or any combination thereof).

One embodiment of the waste cart 10 possesses two openings which can be configured to detect on both sides or be set to detect on a single side.

The design of the waste cart 10 facilitates the full use of the volume of a waste bag 64 allowing it to bulge beyond the perimeter of the base housing 20 and top housing 50 of the waste cart 10.

The design of the waste cart 10 removes the need to lift a potentially heavy waste bag vertically out of the bin, and instead allows a bag to be removed, horizontally.

The waste cart 10 is turned on with a kick switch.

The only task a user must do to bring the waste cart 10 to full operation is to kick the on/off foot switch.

The waste cart 10 possesses an RFID reader which is able to read RFID tags as they pass through the openings 56,57.

The waste cart 10 possesses the ability to disable the alarm if the cart is being moved within a room.

The waste cart 10 has the ability to be configured with multiple sets of coils 100,110 which can be turned on to reduce the detection window to help reduce external interferer influences. For example, in the above-described embodiment of the present invention, turning on additional coils refers to the optional perpendicular coils 115. The perpendicular coils possess a detection field which is perpendicular to the standard orientation of the fields of coils 100,110. Using some signal processing, the perpendicular detection field can be used to validate a detection vs external interferers such as rebar in the floor. The effect is much like a Venn diagram of the sets of detection fields which help to narrow the spatial detection field.

One embodiment of the present invention discloses a waste disposal system 10 comprising a base housing 20; a center upright body 40 which has a proximal end 42 and a distal end 44, wherein the proximal end 42 is secured to the base housing 20; a top housing 50 which is secured to the distal end 44 of the center upright; wherein the base housing 20, center upright body 40, and the top housing 50 each is formed of a material that is amenable to disinfectant in the hospital environment and has surfaces contoured for easy cleaning in the hospital environment. The top housing 50 has at least two separate disposal portions: a first waste portion 70 for waste other than sharps, the first waste portion 70 having an opening 57 large enough to receive waste that is typically other than sharps in the hospital environment; and a second waste portion 75 for waste other than sharps, the second waste portion 75 having an opening 56 large enough to receive waste that is typically other than sharps in the hospital environment. A barrier 58 separates the first waste portion 70 from the second waste portion 75, within which part of a metal detector is located and an indicator system for providing a notification when a metal item is unintentionally placed in an opening, wherein the metal detector includes a receiver coil 110 and a transmitter coil 100 oriented perpendicular to the passage of waste to allow for more accurate detection in the passageways while simultaneously limiting the detection above and below the coils. An electronics module 90 operates each of two metal detectors independently of one another, and an audible alarm indicator is operationally associated with the electronics module 90, which is activated whenever the electronics module detects the passage of a piece of metal through one or more of the waste openings 56,57.

In one embodiment, the above waste disposal system may be configured wherein the coils are set up in either a constant wave (CW) configuration or a pulse induction (PI) configuration. In another embodiment, the waste disposal system utilizes a quadrapole arrangement, wherein a single transmitter coil 100 encircles both the first waste opening 56 and the second waste opening 57 and a first receiver coil is set to detect metal and a second coil is set to cancel external effects. In still another embodiment, the above waste disposal system further includes a blocking shield to help isolate one region magnetically from another. The blocking shield is comprised of Mu-metal.

Metal Detection

The control circuitry operates in a cyclical nature with a detection period representing a transmitted pulse, sampling of values and accessory processes. Each detection period lasts 10 milliseconds and has a rate of 100 Hz.

Figure 11:
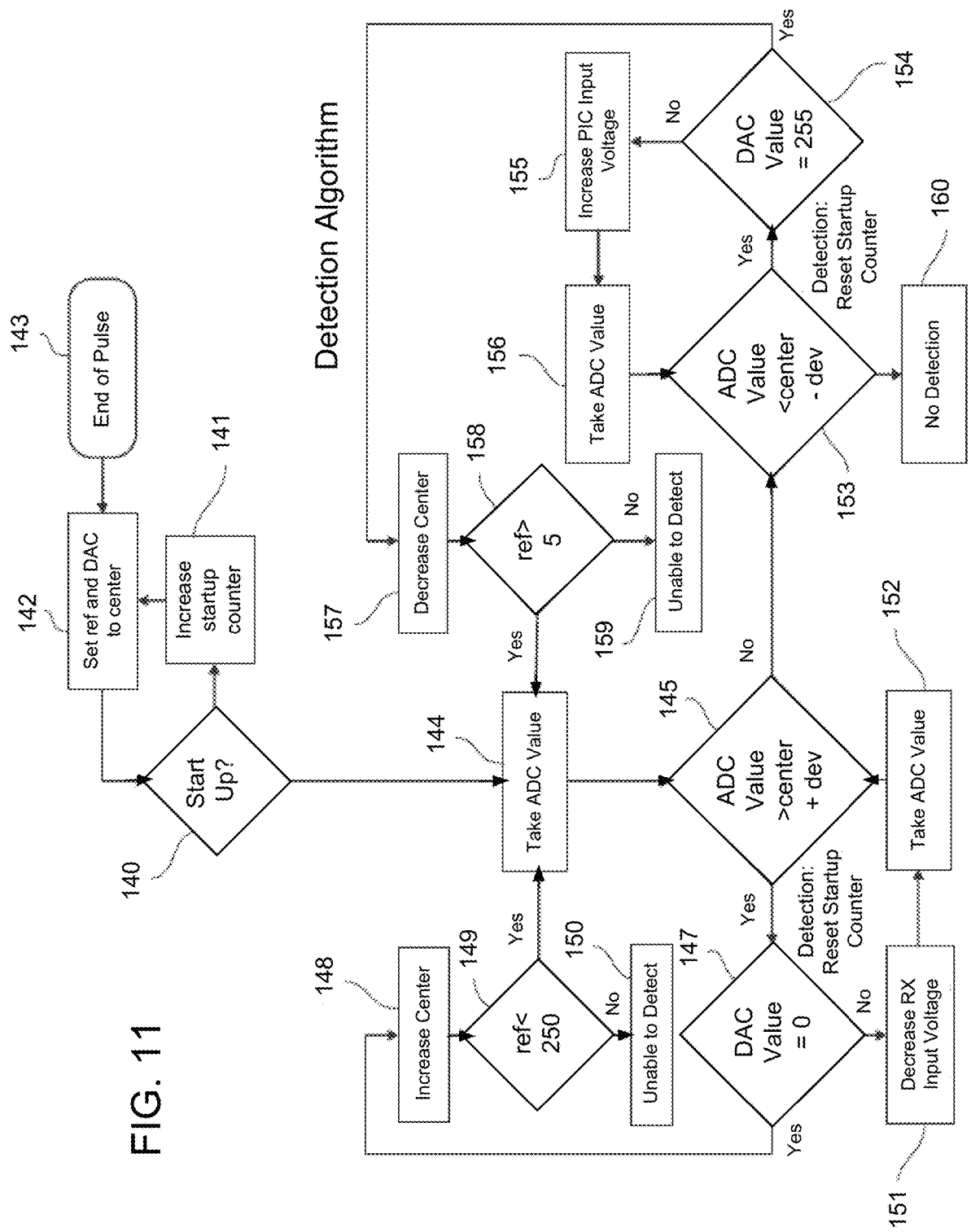
FIG. 11 is a diagram of a detection algorithm of one embodiment of the present invention.
Figure 12:
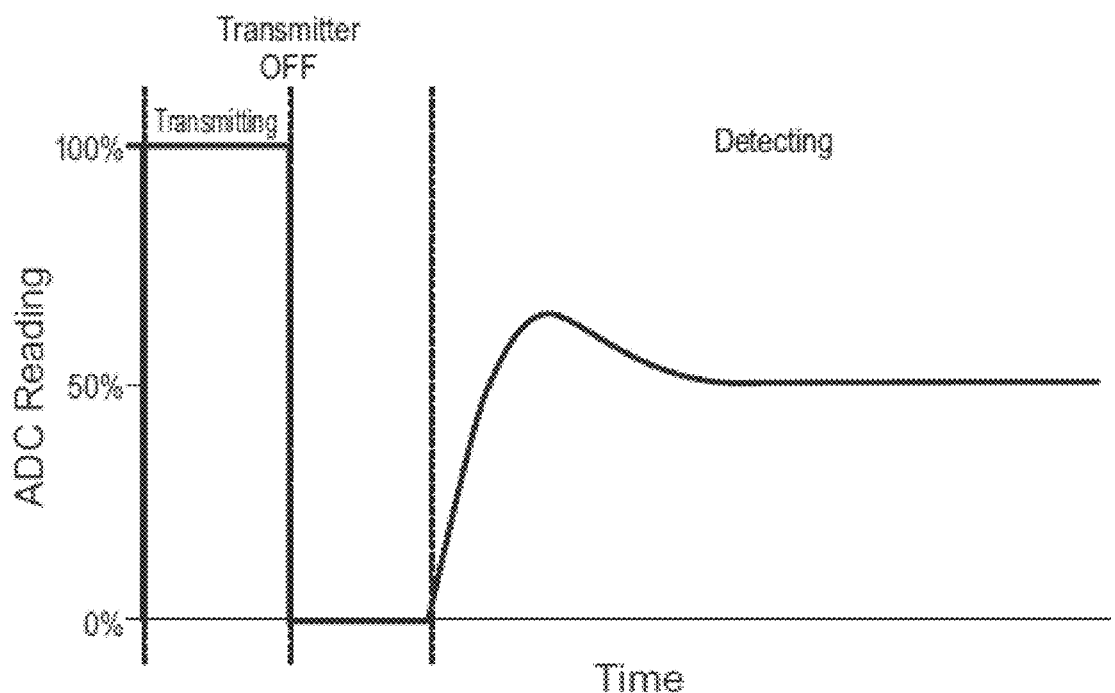
FIG. 12 is a diagram illustrating an ADC reading showing a characteristic curve of one embodiment of the present invention.

Looking to FIG. 11, there is illustrated one embodiment of a detection algorithm used in the present invention. The detection cycle starts at step 140 with the energizing of the transmitter coil (as seen in FIG. 12). Step 141 represents an increase in the startup counter which records the number of times the cart 10 has started up. Step 142 represents the calibration and setting the reference number and calibrating the digital to analog converter (DAC) to center. Step 143 represents the end of a transmitted pulse. Step 144 represents the acquisition of an analog to digital converter (ADC) value which then leads to step 145 wherein it is determined whether that value is greater than the center value set in step 142, taking into account a standard deviation. If the ADC value in step 145 is greater than the center reference the startup counter is reset and the DAC value is determined (step 147). If the DAC value equals zero, then we move on to step 148, which is to increase the center. Proceeding to step 149, where it is determined whether the reference is less than 250. If it is not then there is an inability to detect (step 150), and if it is then we return to step 144, with an acquisition of the ADC value. If the DAC value from step 147 does not equal zero, then we proceed to step 151, wherein there is a decrease in the RX input voltage, which takes us to step 152, wherein the ADC value is taken and we proceed to step 145 again. If the ADC value is not greater than the center value at step 145, taking into account standard deviation, then we proceed to step 153 which determines whether the value is less than the center minus the acceptable deviation. If the result of step 153 is negative, then we move on to step 160 which is no detection. If the result of step 153 is positive then the startup counter is reset and we move on to step 154, where it is determined whether the DAC value is equal to 255. If the answer is yes, then we move on to step 157, which is to decrease the center. Proceeding to step 158, it is determined whether the reference is greater than 5. If it is not then there is an inability to detect (step 159) and if it is, then we return to step 144, with an acquisition of the ADC value. If the DAC value is not equal to 255 in step 154, we proceed to step 155 which is to increase the PIC input voltage. We then proceed to step 156, wherein the ADC value is taken again, after which we return to step 153 to determine whether the ADC value is less than the center value minus the standard deviation. In one embodiment of the present invention, steps 147 through 160 are utilized as background compensation.

In FIG. 12, the solid black line represents the value read from the sum of the two detection coils 110, this is the ADC value. This read value is a conversion of analog voltage level from the sum of the two detection coils 110 being processed through an Analog to Digital Converter (ADC). The physics relating to the ADC limit the range the ADC can read which shows as the flat line when the transmitter is operating. Once the transmitter is turned off, there is a period where the ADC is shut off to let the electronics settle. After a period of time, the ADC is turned back on. The solid black line illustrates the characteristic detected voltage curve read by the ADC without a detectable object within the detection field.

Figure 13:
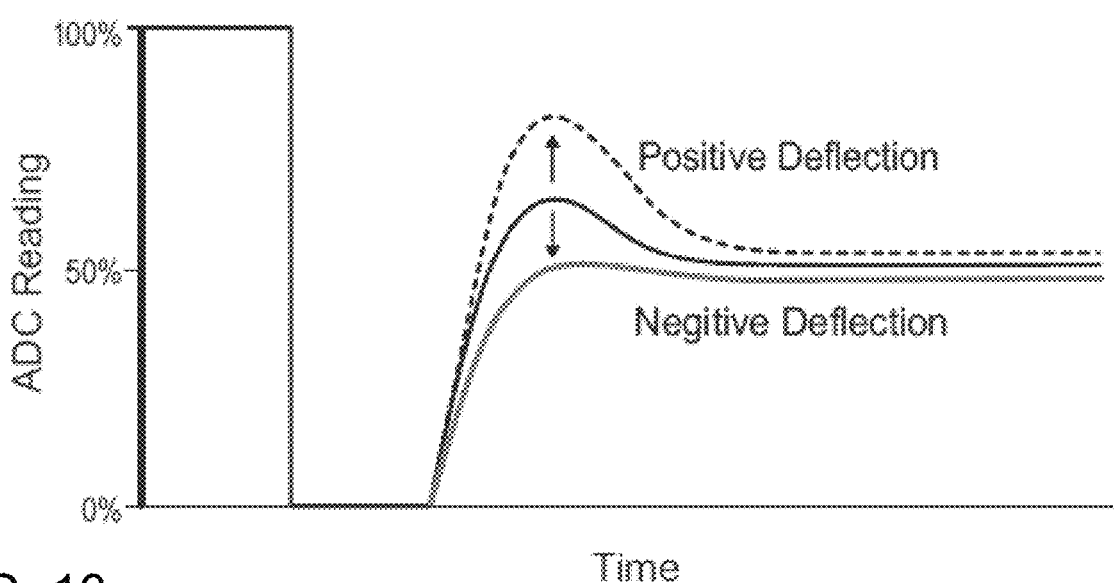
FIG. 13 is a diagram illustrating an ADC reading showing positive and negative deflections of one embodiment of the present invention.

The two detection coils 110 are balanced and operate in unison to discriminate the detection side. The coils are balanced to assist in the fine discrimination of changes of voltages. A metallic object passing through the field of the coil connected to the positive leg of the summing junction would result in a positive deflection of the ADC value. Conversely, as a metallic object passes through the detection coil connected to the negative leg of the summing junction, the result would be a negative deflection in the ADC value. This behavior is shown in FIG. 13. The entire curve deflects as a metallic object passes through either of the detection coils, but there is generally a proportionally greater change in the ADC value closer to the shut off of the transmitter than there is farther from the transmitter shutoff.

Figure 14:
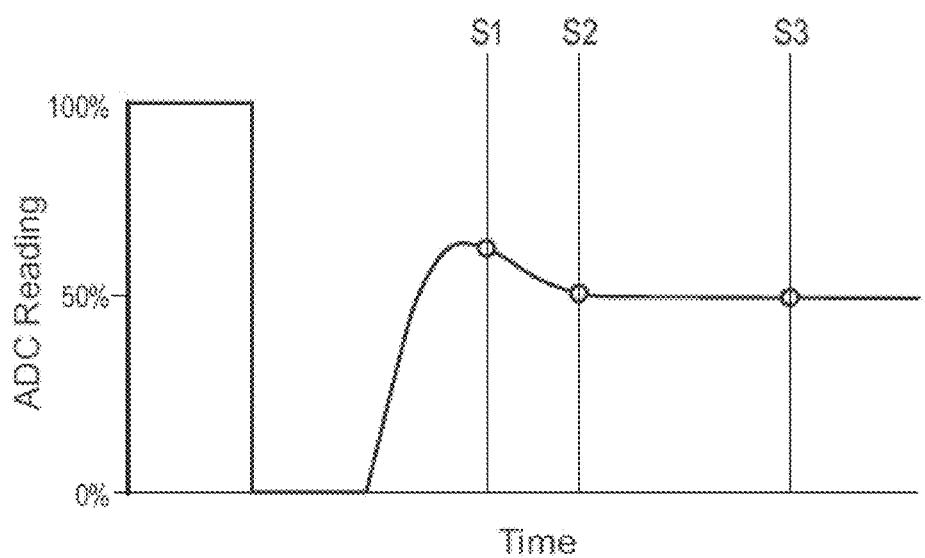
FIG. 14 is a diagram illustrating an ADC reading showing a characteristic curve and sampling points of one embodiment of the present invention.

The system operates very quickly and processor time must be managed appropriately to ensure accurate readings. Rather than take ADC values along the entire detection period, sampling values are established, shown in FIG. 14. The vertical lines S1, S2, and S3 represent a system with three sampling points; however, additional or fewer points can be read. The vertical lines illustrate the period in time when an ADC value is taken. The circular dots in FIG. 14, are representative of the ADC value being read.

In an effort to reduce noise which is present in any system, the averages of these points are taken over a period of sixteen samples. There is a trade off in performance when averaging the samples. A sample occurs during each detection cycle, therefore averaging sixteen samples requires sixteen cycles to transpire. If there is a detectable value that is read, that value must be present in the detection field long enough for its effect to pass through the averaging processing and register a detection. If too many samples are used, the system could miss quickly traveling objects. If too few samples are taken, the effect of noise can lead to false positives. The system relies on sensitive electronics looking at very minute deviations in voltages which make noise a significant factor in the performance balancing.

Figure 15:
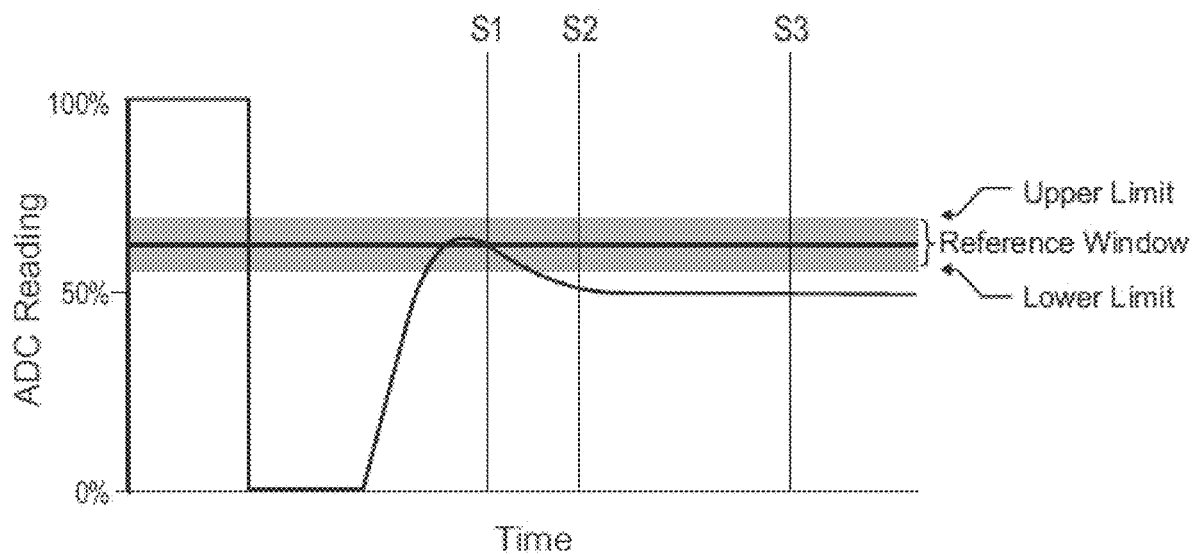
FIG. 15 is a diagram illustrating an ADC reading showing a characteristic curve and a detection threshold window of one embodiment of the present invention.
Figure 16:
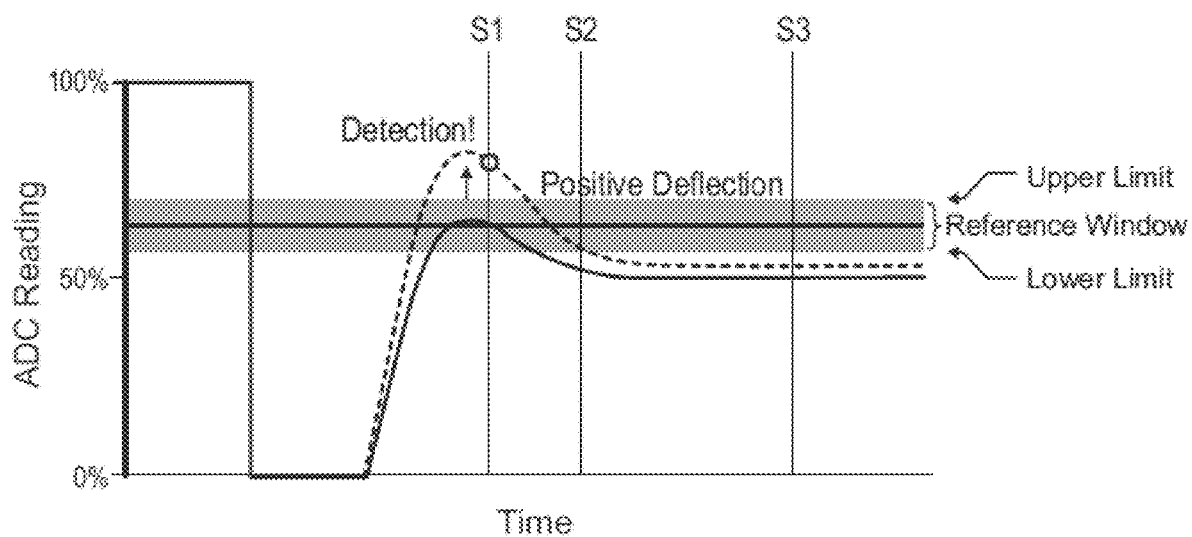
FIG. 16 is a diagram illustrating an ADC reading showing a characteristic curve and illustrating one embodiment of a positive deflection in the present invention.
Figure 17:
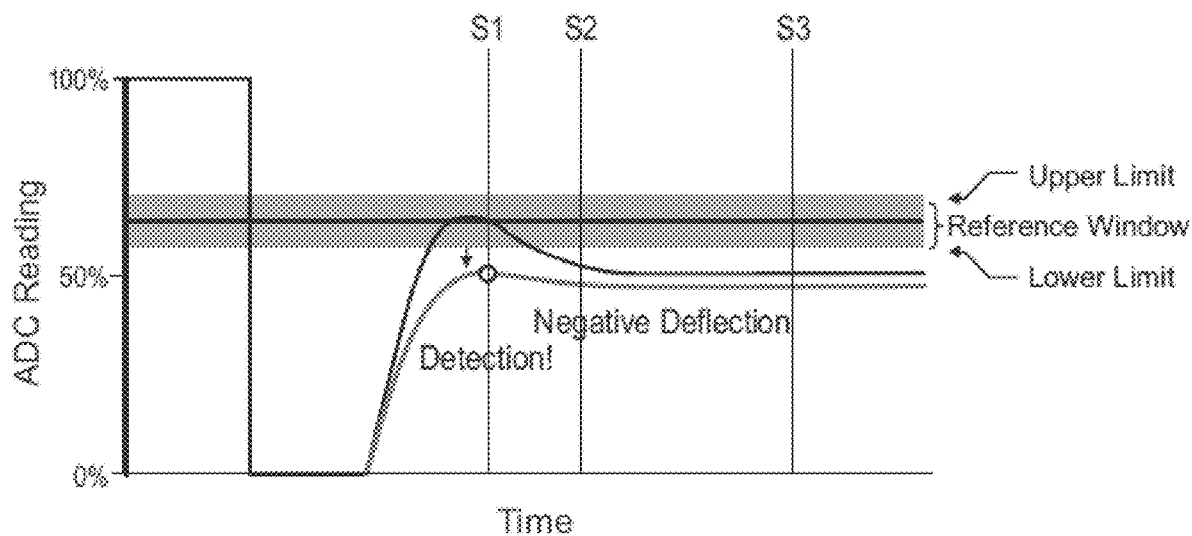
FIG. 17 is a diagram illustrating an ADC reading showing a characteristic curve and illustrating one embodiment of a negative deflection in the present invention.

For discussion of detections, this description will be referring to sampling point "S1" in the figures but the sample statements hold true to any of the detection points. The system acquires the averaged ADC values at each of the sample points. These averages become the resting value. If the average deviates from this value, the system recognizes the behavior as a detection caused by a metallic object passing through one of the coils. Noise is still a factor, even with averaging, which to compensate a deviation window is established, seen in FIG. 15. The ADC value may vacillate within this window without causing a detection. If, however, the value is great enough, the system will recognize this situation as a detection. This deviation can either be positive FIG. 16 or negative FIG. 17 depending on which detection coil the metallic object has passed through.

Figure 18:
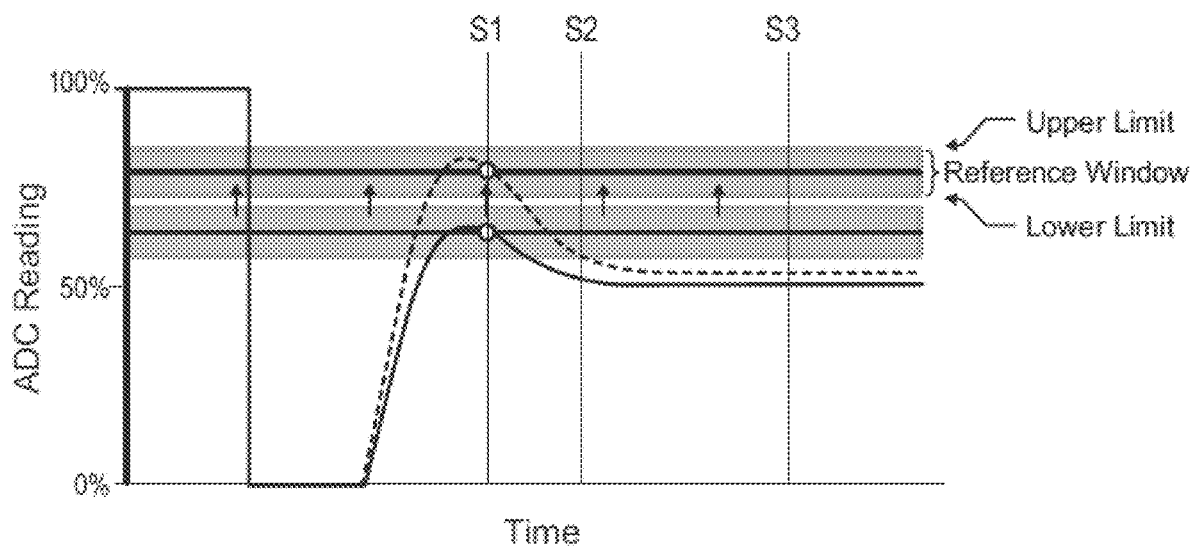
FIG. 18 is a diagram illustrating an ADC reading showing a characteristic curve and illustrating one embodiment of background compensation in the present invention.

The detection circuitry reads any field generated by any metallic object. This may be a metallic object passing through the detection coils 110 or it could be an object next to the device, defined as an interferer. Under ideal operating conditions, the system is set so the signals within the detection coils 110 are far greater than that of the surrounding objects. Significantly large interferers or quantities of interferers in close proximity to the detection coils can appear as if they were an object passing through the detection coils and signal a false positive. To address this issue, the system takes advantage of the difference in time base between a proper signal and interference from the environment. An object passing through the openings as if it were being thrown away will have a relatively quick transient change when compared to the signal change of the entire waste cart 10 being moved around a room. If the cart is moved in close proximity to a large interferer, the control system will recognize a change in ADC value and signal a detection. As the ADC value remains the same, the system will recognize this value as most likely an interferer and adjust its threshold value to establish a new reference value with a proper window as shown in FIG. 18. In FIG. 18 the solid grey line represents the previous characteristic ADC response. The dashed grey line represents the characteristic signal when the cart is placed next to an interferer. The detection window is adjusted by the system to compensate for the change in environmental response.

Figure 19:
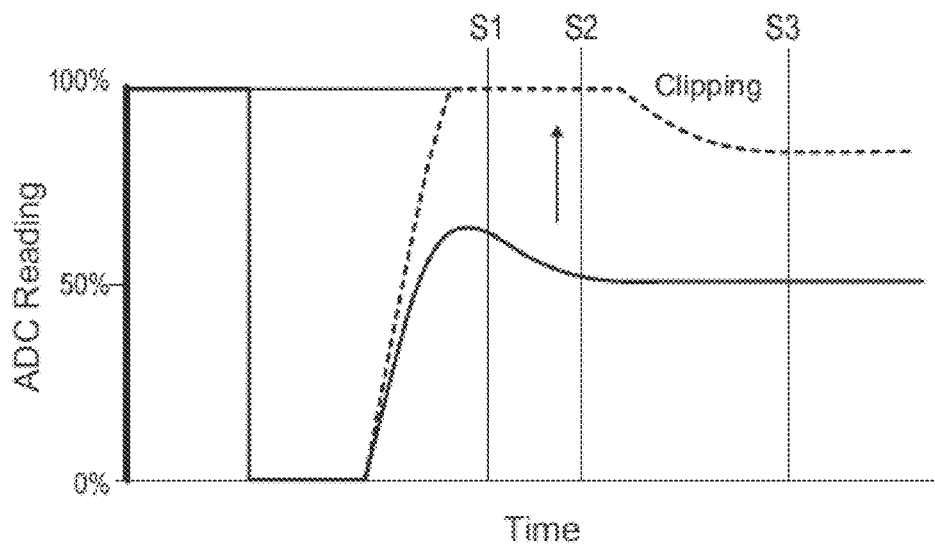
FIG. 19 is a diagram illustrating an ADC reading showing a characteristic curve and illustrating one embodiment of signal clipping in the present invention.
Figure 20:
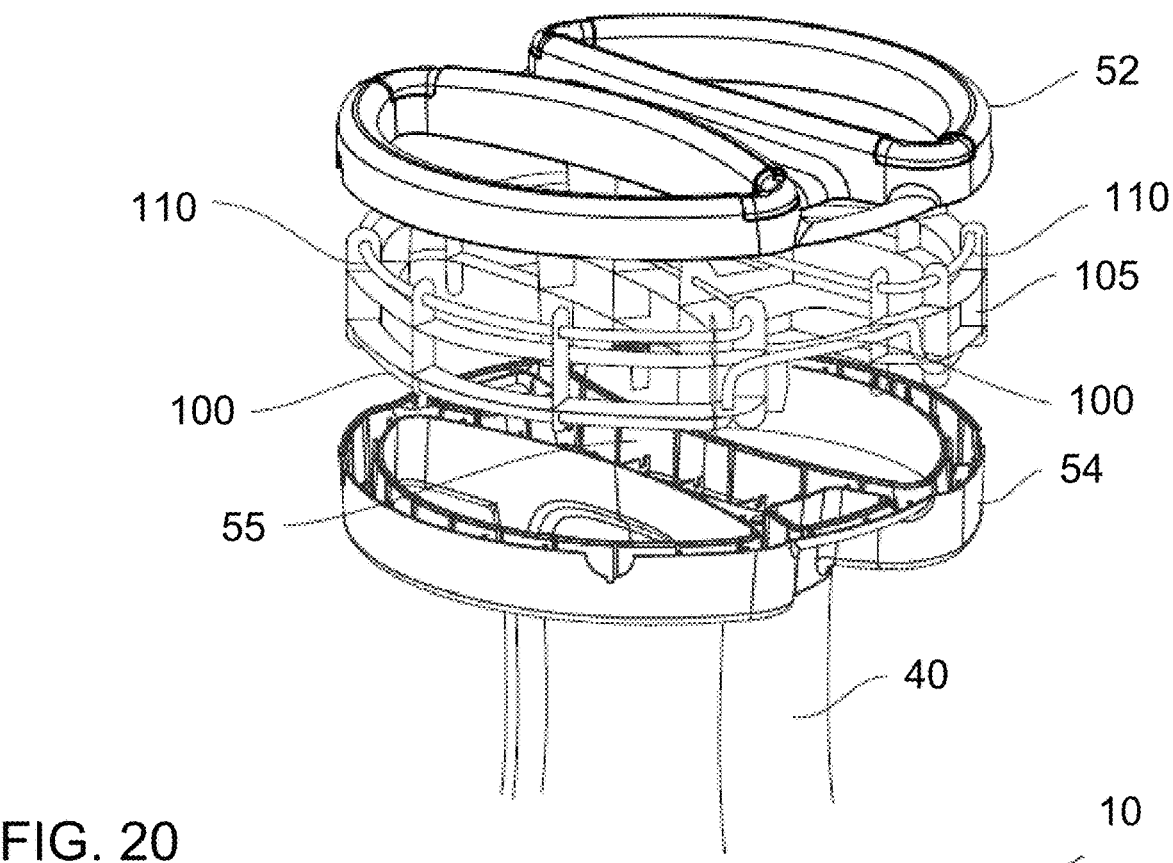
FIG. 20 is an exploded perspective view of a method for holding the coils of one embodiment of the present invention.
Figure 21:
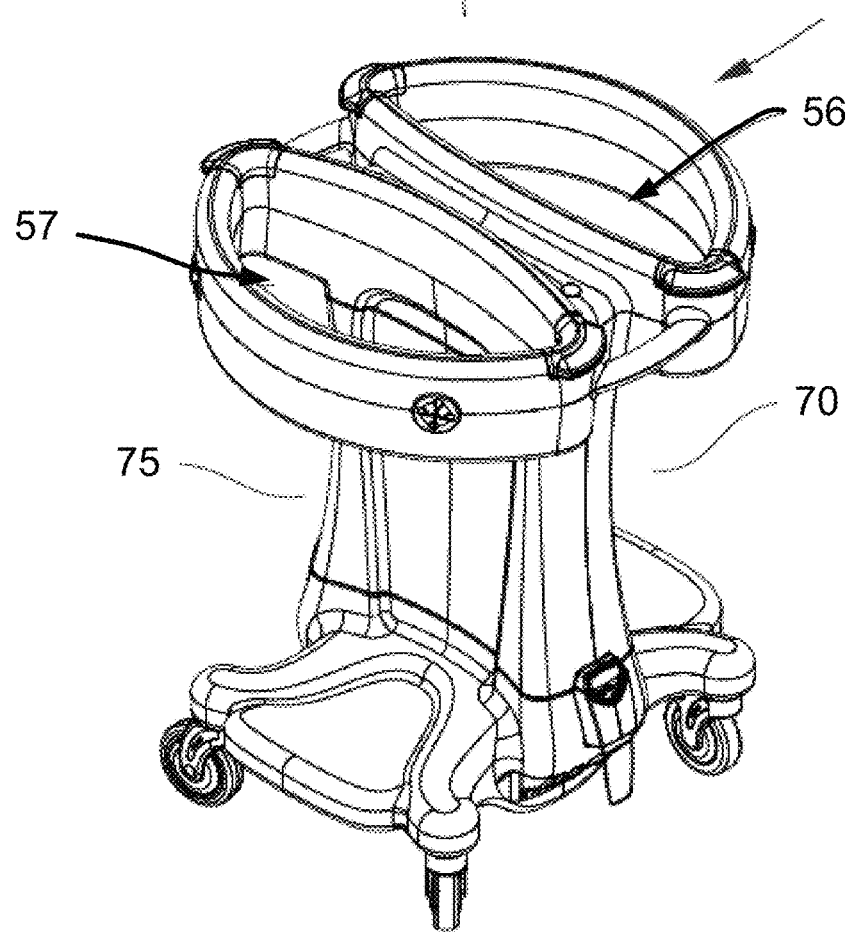
FIG. 21 is a perspective view of one embodiment of the present invention.
Figure 22:
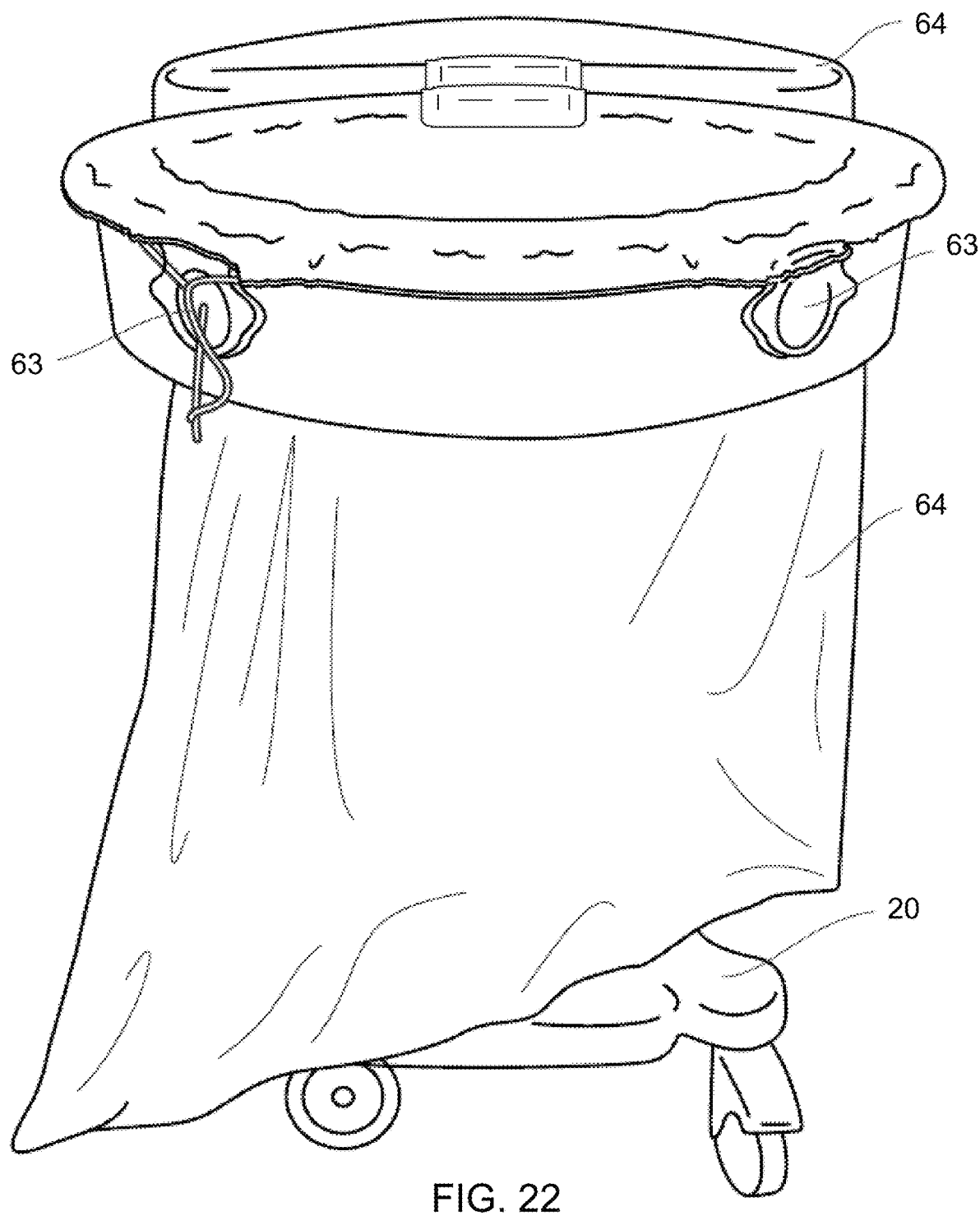
FIG. 22 is a perspective view of one embodiment of the present invention.

There are instances where an interferer may be too close or too powerful of a response that the signal reaches the limits of the ADC and the signal becomes clipped FIG. 19. This clipping is unavoidable since the ADC can only operate within physical limits of the chip. In the case illustrated in FIG. 19, any further deflection of the curve will not be seen by S1 or S2 since they are within the clipped region. The signal at S3 however, still retains some of its ability to detect changes and can therefore still detect certain larger objects passing through the coils. If the cart ends up in a situation where it is not able to perform properly it will let out a cycling tone to let the user know it is not able to operate correctly, 150 and 159.

Perpendicular Coils

The current coil arrangement places the coils in a plane parallel to the ground. In this orientation, the detection circuitry and coils are more sensitive to metallic objects both above (towards the ceiling) and below (towards the floor) the coils. To help reduce the influence of interferers, a second set of coils, disposed perpendicular to the coils parallel to the ground (FIGS. 23 and 24) can be activated. The overlap between the two operational sets of coils acts to define the region of most sensitive detection. The theory was tested via setting a commercial coil based metal detector product in this arrangement. The detector was not sensitive to metallic objects in the floor or ceiling but possessed a higher sensitivity to metallic objects about the circumference of the main detector coils. In one embodiment of the present invention, both sets of coils operate in alternate turns of detection. A logic scheme was constructed that coordinates the detection of both sets of coils, effectively narrowing the detection space to an optimal size.

Cart Movement Sensing

A metal detector relies on the disturbances of electrical fields to determine if a metallic object is present or not within its field of detection. This operation makes it nearly impossible to distinguish between a metallic object being moved into the field or if the field is being moved into close proximity of the detector. This situation is pertinent to the current device in that if the device is moved into close proximity to a metallic object, say a table or cabinet, the detector will register this object as a detected object and signal detection. This detection is undesirable in that the waste cart 10 is intended to detect objects passing into the field surrounding each opening 56,57 at the top of the cart. A detection resulting from the waste cart being moved into close proximity of a metallic object would be viewed as a false detection and appear as an error in the cart. To address this issue, methods have been implemented to disable the detection function while the cart is in motion.

One of the methods for disabling the alarm while the cart is in motion is by means of an accelerometer 83. The accelerometer causes disablement of the detection and/or notification while the cart is being moved from one location to another. It has been assumed that while the cart is being moved, there is a small likelihood of a user passing an article of waste through the detection field. Assuming this is the case, since the sensor will disable the detection and/or notification while in motion, it will not be apparent to the user if they move the cart into close proximity to a metallic object thus causing the circuitry to register a detection as it was a false detection to begin with.

Another method for detecting motion of the cart is with a downward facing optical detector or motion camera 82. This detector registers the surface of the floor. If the cart is moved, the detector will disable the detection and/or notification until the cart has stopped moving and the detector recalibrates to the new environment. The detection preferably would be disabled while the cart is in motion and would also be disabled during the calibration once it has stopped.

Either method is able to disable the detection and/or notification while the cart is in motion. However this is accomplished, it has been identified that it may be advantageous to signal the user that the cart is in motion and any articles passing through the cart will not be detected and/or noticed. This signaling of the user can be visual or auditory.

Cart Cross Talk

In one embodiment of the present invention, two waste carts 10 exist in a relatively close proximity to one another. When this occurs, each cart has the ability to create a false detection on the other cart. Methods for dealing with this cross talk have been explored. As described earlier, each cart accomplishes metal detection by creating a magnetic field by applying an electrical current through a wire loop for a short amount of time. Once, the current is shut off, the cart records the magnetic fields of any metallic objects within proximity to the cart. This scheme happens in a cyclic fashion at a set frequency. If two carts are placed in close proximity of each other, the likelihood of the detection cycles overlapping is small as the detection cycle is a small percentage of the frequency period. As systems are not perfect, the frequency on one cart will be slightly off from the other cart. This will cause the detection point in one cart to drift in relation to the other cart. If one cart happens to be recording the magnetic field of the surroundings looking for metallic objects when the other cart is creating a magnetic field, a detection will be recorded on the first cart. It is thus imperative that the detection period for each cart is kept away from the detection period of the other cart.

Figure 27:
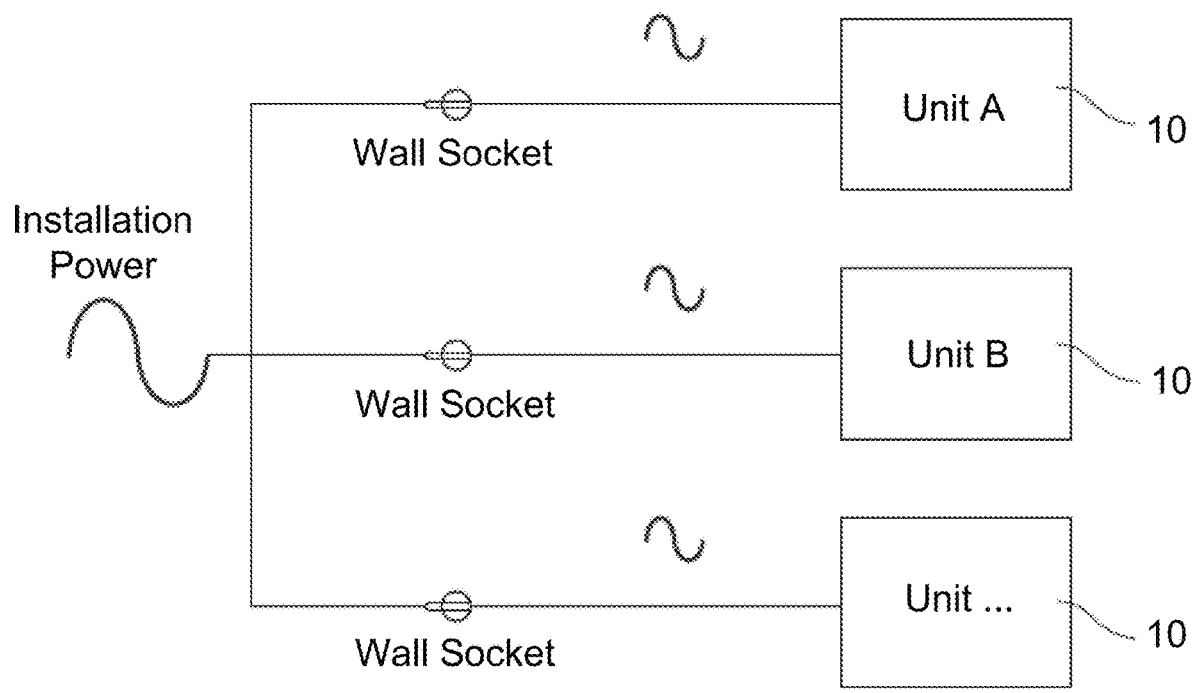
FIG. 27 is a diagram of the installed wiring synchronization setup of one embodiment of the present invention.

The most basic method at achieving interval spacing has been utilizing the 60 Hz AC wall power signal to acts as a clock for all of the systems. There are generally three phases of power that enter a building. Each of the phases is 120 degrees out of phase with the next. The carts could use the AC wall frequency to set when the signaling and detecting phases occur and not interfere with other carts (shown schematically in FIG. 27).

Figure 26:
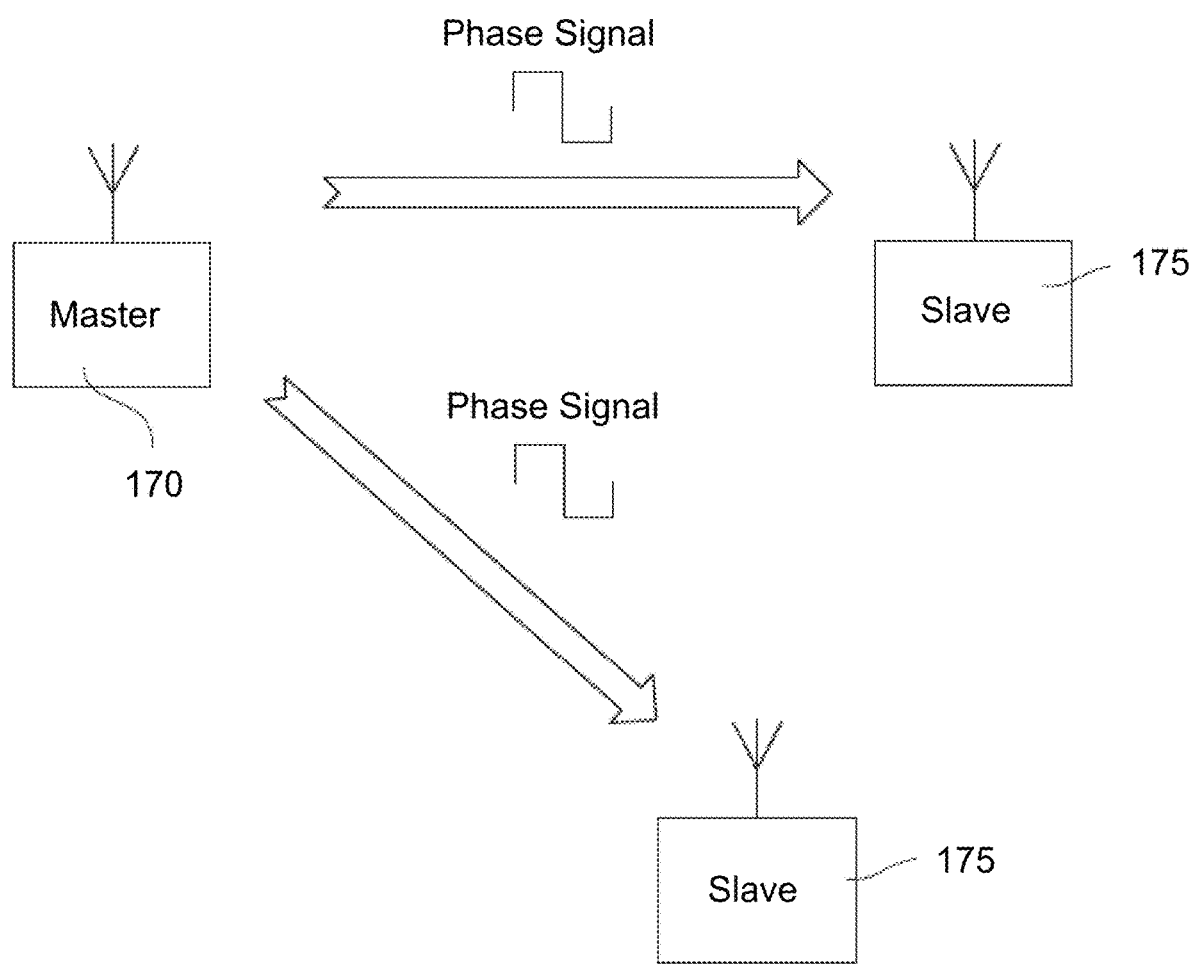
FIG. 26 is a diagram of the master/slave synchronization setup of one embodiment of the present invention.

A more complex method of detection spacing involves the carts being able to communicate with other carts nearby. Through a wireless protocol, a cart would be designated as a master cart 170 charged with setting the detecting timing for any carts (slave carts, 175) within distance of the master cart 170 (shown schematically in FIG. 26). With the detection timing set and actively monitored, there would be less chance of false detections due to cross talk.

Power Line Filtering

The installation wiring and associated electrical equipment result in a relatively noisy environment for the metal detectors to operate in. To combat this issue, the frequencies of the power lines have been selectively filtered out. This allows for more consistent operation across multiple environments.

Isolation of Detection and Power Circuitry

When powered from installation wiring, the unfiltered power causes noise in the detection system. To help compensate for this noise, the detection circuitry and power handling circuitry is electrically separated. This results in higher achievable accuracy and less false detection.

RFID (Radio-Frequency Identification)

Figure 28:
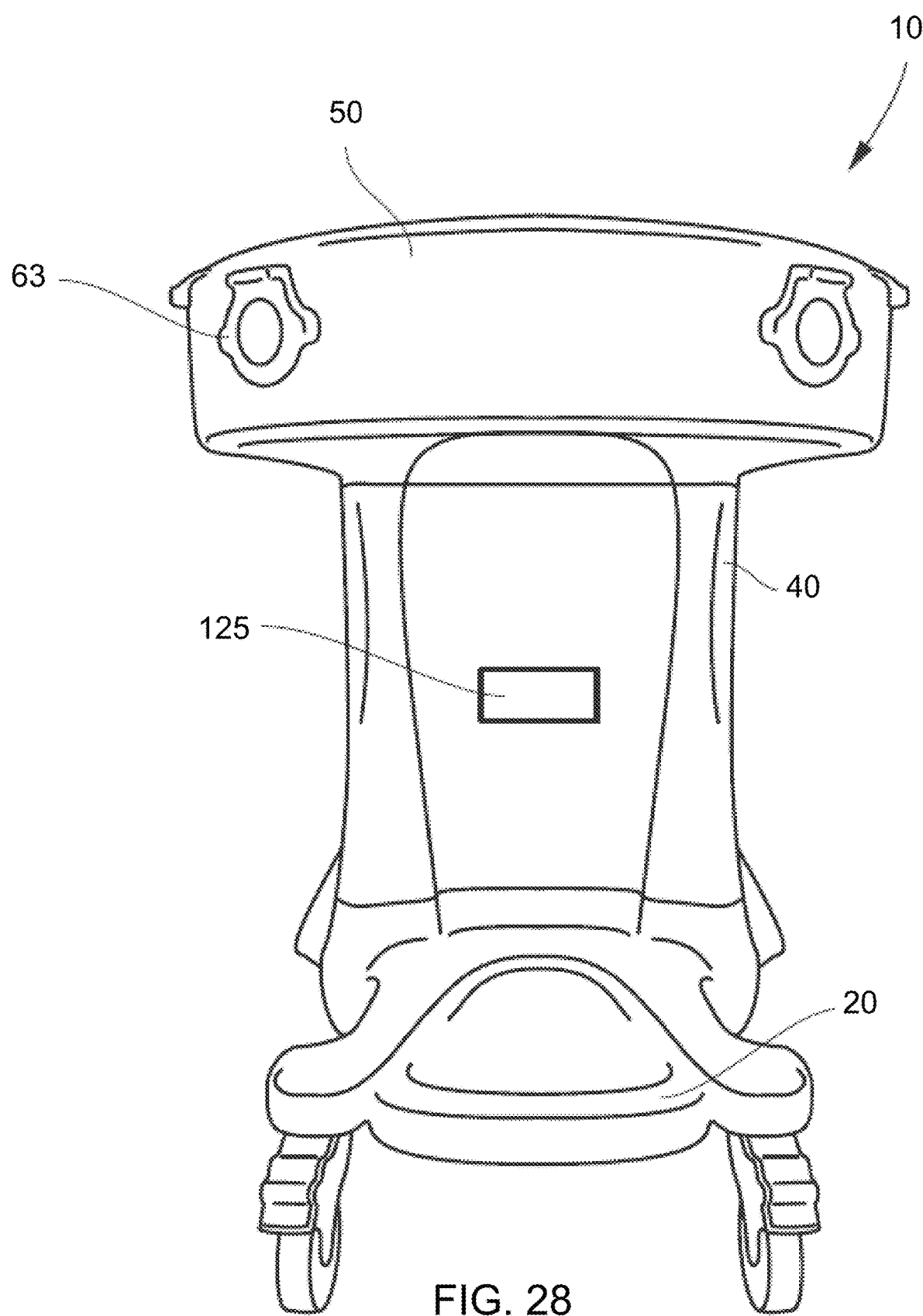
FIG. 28 is a side view of an RFID detector used in one embodiment of the present invention.

It was determined through operational studies that it would be advantageous for the carts to be able to track items with attached RFID tags. This would allow for the carts to detect and track items which may not be metallic. To accomplish this, the carts are fitted with an RFID antenna and detection circuitry 125 (FIG. 28). As an RFID tagged item passes through the opening, the RFID circuitry energizes the tag. The tag broadcasts the information on the tag. The RFID circuitry 125 detects the broadcasted information and is able to register that the item has passed through the opening and into the waste bag.

The invention described herein also includes any method of using the waste cart/medical waste disposal system to detect metallic objects and/or prevent the loss of equipment and supplies.

Any method described herein may incorporate any design element contained within this application and any other document/application incorporated by reference herein.

In one embodiment of the present invention, the waste cart 10 is intended to be used in the operating room after a surgery has been conducted and the patient has been removed from the room. It has been determined that valuable equipment is being accidentally and/or inadvertently thrown away during the clean up after a medical procedure. This loss is accidental wherein equipment becomes lost with the medical drapery used in a medical procedure and is not found by the time the drapes have been thrown away. The waste cart 10 has been designed to help mitigate the loss from this modality.

In another embodiment of the present invention, the waste cart 10 is intended to be used within any environment where valuable items are thrown away which have a metallic component capable of being detected by a waste cart as described herein. Those environments include, but are not limited to, machine shops, automobile garages, assembly plants, laboratories, manufacturing plants, and similar facilities.

In one embodiment, the waste cart 10 is fit with two waste bags 64 about the two openings 56,57 on the cart. A bag 64 is passed over the two bag supports 61 at the corners of one of the half circle openings 56,57. The bag 64 is pulled taught, twisted near one of the outer perimeter bag retainers 63 and pressed into the bag retainer. The waste cart 10 will be used as a standard waste receptacle prior to and during a procedure. At the conclusion of a procedure, the patient is removed from the room and the cleanup commences. Once the patient has been removed the waste cart 10 is positioned for ease of use. The cart is then turned on via the power switch 80 (i.e., kick switch). A visual indicator (not illustrated) on the sides of the cart will illuminate when on to signal to the user that the cart is ready to receive waste. The cart is then ready to detect metallic objects passing through it. To the user this appears instantaneous, not requiring a long calibration period prior to use. Waste is placed into the openings 56,57 of the cart as it would be a normal waste receptacle. If a metallic object passes through the opening 56,57 then an audible tone will be played through the speaker 67 and the visual indicators 65 on the top housing 50 of the cart will light up. After all waste has been disposed of or when a bag 64 has been filled, the technician removes the bag from the bag retainer 63 on the side of the top housing 50 and pulls the full bag from the side of the cart. A fresh bag can be replaced if desired or necessary. The waste cart 10 is wiped down to clean any foreign matter from its surface and turned off. If the waste cart 10 is not turned off, it will automatically turn off if left without a detection for 15 minutes. A retractable power cord can be extended to reach the nearest power receptacle for charging of the internal battery.

In another embodiment, the present invention includes a method for detecting metallic objects as they pass through a waste cart 10 including the steps of:

(a) providing the waste cart 10 comprising a base housing 20, a center upright body 40 which has a proximal end 42 and a distal end 44, the proximal end 42 being secured to the base housing 20, a top housing 50 secured to the distal end 44 of the center upright 40, wherein the top housing 50 has two or more disposal openings 56,57 for two or more separate disposal portions comprising, a first waste portion 70 for waste other than sharps which has a first metal detector 71 and an indicator system for providing a notification when a metal item passes through the opening 57, and a second waste portion 75 which optionally includes a second metal detector 76 and an indicator system for providing a notification when a metal item passes through the other opening 56, an electronics module 90 which operates each metal detector independently of one another and an alarm indicator 65,67 operationally associated with the electronics module 90 which is activated whenever the electronics module 90 detects the passage of a piece of metal through one or more of the waste openings 56,57;

(b) activating the electronics module 90 and metal detectors 71,76;

(c) collecting waste generated during a procedure by placing the waste through the disposal openings into either the first or second waste portions 70,75;

(d) activating the alarm indicator in the event that one of the metal detectors indicates the passage of a metallic object though a detection field;

(e) retrieving the metallic object from the first or second waste portions 70,75; and (f) repeating steps (b) through (e) until the desired waste is collected.

In one embodiment, the waste disposal system used in the above method may be configured wherein the coils are set up in either a constant wave (CW) configuration or a pulse induction (PI) configuration. In another embodiment, the waste disposal system used in the above method utilizes a quadrapole arrangement, wherein a single transmit coil 100 encircles both the first waste opening 56 and the second waste opening 57 and a first receive coil is set to detect metal and a second coil is set to cancel external effects. In still another embodiment, the above waste disposal system used in the above method further includes a blocking shield to help isolate one region magnetically from another. The blocking shield is comprised of Mu-metal.

Regarding step (c) of the method described herein, a "procedure" encompasses a variety to tasks including a medical or surgical procedure, the manufacture of a device or component, the assembly of a device or component, the repair of a device or component, or any other activity within any environment where valuable items have a metallic component capable of being detected by a waste cart as described herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

What is claimed is:

1. A waste receptacle, comprising:
   (a) a top housing in which a isposal opening extends;
   (b) a base housing;
   (c) a support extending between the base housing and the top housing and supporting the top housing above the base housing at a height accommodating retention of a waste bag such that waste passes through the disposal opening is received within the waste bag;
   (d) a coil arrangement contained within the top housing and including (i) a transmitter coil comprising a wire loop that extends around and encircles a perimeter of the top housing, and (ii) two receiver coils each comprising wire loops, only one of which receiver coils extends around and encircles a perimeter of the disposal opening;
   (e) an electronics module connected to and operationally associated with the coil arrangement and configured to detect passage of a metal item through the disposal opening; and
   (f) an indicator system connected to the electronics module, by which an indication is provided of a detection of passage of a metal item through the disposal opening.

2. The waste receptacle of claim 1, wherein the electronics module is located within the base housing.

3. The waste receptacle of claim 2, wherein the support contains electrical connections extending between the base housing and the top housing for connecting the electronics module and coil arrangement.

4. The waste receptacle of claim 1, wherein the receiver coils of the coil arrangement are arranged generally horizontally, and wherein the coil arrangement further comprises two additional receiver coils arranged generally vertically and located on a side of the disposal opening.

5. The waste receptacle of claim 1, further comprising a kick switch located on the base housing and configured to turn on and off by foot detection of a metal item that passes through the disposal opening by the electronics module and coil arrangement.

6. The waste receptacle of claim 1, further comprising a battery located within the base housing for powering detection of a metal item that passes through the disposal opening by the electronics module and coil arrangement.

7. A waste receptacle, comprising:
   (a) an upper section comprising a top housing in which a disposal opening extends, the upper section being configured to retain a bag for receiving waste therein that passes through the disposal opening;
   (b) a lower section;
   (c) a middle section extending from the lower section and structurally supporting the upper section above the lower section at a height accommodating retention of the bag from the upper section for filling of the bag with waste;
   (d) a coil arrangement contained within the top housing and including (i) a transmitter coil comprising a wire loop that extends around and encircles a perimeter of the top housing, and (ii) a pair of receiver coils each comprising wire loops, only one of which receiver coils extends around and encircles a perimeter of the disposal opening;
   (e) an electronics module connected to and operationally associated with the coil arrangement and configured to detect passage of a metal item through the disposal opening; and
   (f) an indicator system connected to the electronics module, by which an indication is provided of a detection of passage of a metal item through the disposal opening.

8. The waste receptacle of claim 7, wherein pulse induction is used in the electronics module and coil arrangement to detect passage of a metal item through the disposal opening.

9. The waste receptacle of claim 7, wherein the pair of receiver coils of the coil arrangement are arranged generally horizontally, and wherein the coil arrangement further comprises a second pair of receiver coils arranged generally vertically and located on a side of the disposal opening.

10. The waste receptacle of claim 7, wherein the middle section is configured to be secured to the top section, and wherein the top section is configured to be secured to the middle section.

11. The waste receptacle of claim 7, wherein the lower section further comprises a base housing that contains the electronics module.

12. The waste receptacle of claim 11, wherein the middle section contains electrical connections that extend between the top housing and base housing and connect the electronics module and the coil arrangement.

13. The waste receptacle of claim 7, wherein the indicator system comprises a visual alarm indicator.

14. The waste receptacle of claim 13, wherein the visual alarm indicator is located on the top housing.

15. The waste receptacle of claim 7, wherein the indicator system comprises a speaker that provides an auditory indication of a detection of passage of a metal item through the disposal opening.

16. The waste receptacle of claim 7, wherein the lower section further comprises a kick switch for turning on and off by foot detection of a metal item that passes through the disposal opening by the electronics module and coil arrangement.

17. The waste receptacle of claim 7, further comprising a battery for powering detection of a metal item that passes through the disposal opening by the electronics module and coil arrangement.

18. The waste receptacle of claim 7, further comprising means for powering the waste cart.

19. The waste receptacle of claim 7, further comprising means for disabling the indication of a detection of passage of a metal item through the disposal opening while the cart is being moved.

20. A waste receptacle, comprising:
   (a) a top housing in which two disposal openings extend;
   (b) a base housing;
   (c) a support extending between the base housing and the top housing and supporting the top housing above the base housing at a height accommodating retention of a waste bag on opposite sides of the cart such that waste passing through a said disposal opening is received within a respective one of the waste bags;
   (d) a coil arrangement contained within the top housing and including (i) a transmitter coil comprising a wire loop that extends around and encircles a perimeter of the top housing, and (ii) two receiver coils each comprising wire loops, a first one of which receiver coils extends around and encircles a perimeter of a first one of the disposal openings and a second one of which receiver coils extends around and encircles a perimeter of a second one of the disposal openings;

(e) an electronics module connected to and operationally associated with the coil arrangement and configured to detect passage of a metal item through either of the disposal opening; and
(f) an indicator system connected to the electronics module, by which an indication is provided of such a detection of passage of a metal item.

* * * * *